United States Patent
Edge et al.

(10) Patent No.: US 9,733,337 B2
(45) Date of Patent: Aug. 15, 2017

(54) SUPPORT OF DOWNLINK POSITIONING USING COHERENT AND NON-COHERENT SIGNAL ACQUISITION

(71) Applicant: QUALCOMM Incorporated, San Diego, CA (US)

(72) Inventors: Stephen William Edge, Escondido, CA (US); Guttorm Opshaug, Redwood City, CA (US); Sven Fischer, Nuremburg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/131,838

(22) Filed: Apr. 18, 2016

(65) Prior Publication Data
US 2017/0059689 A1  Mar. 2, 2017

Related U.S. Application Data

(60) Provisional application No. 62/211,611, filed on Aug. 28, 2015.

(51) Int. Cl.
*H04W 24/00* (2009.01)
*G01S 5/02* (2010.01)
(Continued)

(52) U.S. Cl.
CPC .......... *G01S 5/0289* (2013.01); *G01S 5/0236* (2013.01); *G01S 5/0242* (2013.01); *G01S 5/10* (2013.01);
(Continued)

(58) Field of Classification Search
CPC .... G01S 5/0289; G01S 5/0236; G01S 5/0242; G01S 5/10; H04L 5/0091; H04L 27/2649; H04L 5/008; H04W 64/003
(Continued)

(56) References Cited

U.S. PATENT DOCUMENTS 7,307,665 B2 * 12/2007 Opshaug ............... G01S 5/0221
                                                         342/463
9,354,297 B2 *  5/2016 Ling ..................... G01S 5/0226
(Continued)

OTHER PUBLICATIONS

International Search Report and Written Opinion—PCT/US2016/047925—ISA/EPO—Nov. 2, 2016.
(Continued)

*Primary Examiner* — Marceau Milord
(74) *Attorney, Agent, or Firm* — Berkeley Law & Technology Group, LLP

(57) ABSTRACT

Techniques are discussed for conveying frequency error characteristics for a plurality of cell transceivers from a server to a mobile device to enable the mobile device to determine an optimum or near optimum period of coherent integration of a downlink signal from one or more of the plurality of cell transceivers based on the frequency error characteristics. The coherent integration of the downlink signal may be to support a downlink terrestrial positioning method such as the Observed Time Difference of Arrival (OTDOA) method for Long Term Evolution (LTE) and the downlink signal may be a Positioning Reference Signal (PRS). A mobile device may perform downlink signal integration for longer periods than the optimum period for coherent integration by combining coherent integration results using non-coherent integration. The optimum period may achieve maximum or near maximum signal to noise ratio.

30 Claims, 15 Drawing Sheets

(51) Int. Cl.
*G01S 5/10* (2006.01)
*H04L 27/26* (2006.01)
*H04W 64/00* (2009.01)
*H04L 5/00* (2006.01)

(52) U.S. Cl.
CPC ........ *H04L 5/0091* (2013.01); *H04L 27/2649* (2013.01); *H04W 64/003* (2013.01); *H04L 5/0048* (2013.01)

(58) Field of Classification Search
USPC ................. 455/456.1, 404.2, 67.11, 63.1
See application file for complete search history.

(56) References Cited

U.S. PATENT DOCUMENTS

| | | | |
|---|---|---|---|
| 9,414,188 B2* | 8/2016 | Gao | H04W 4/02 |
| 9,491,680 B2* | 11/2016 | Moeglein | H04W 64/00 |
| 9,507,007 B2* | 11/2016 | Markhovsky | G01S 3/74 |
| 9,560,627 B2* | 1/2017 | Lin | H04W 4/025 |
| 2007/0040740 A1 | 2/2007 | Abraham et al. | |
| 2010/0087204 A1* | 4/2010 | Islam | G01S 5/0215 455/456.1 |
| 2012/0015667 A1* | 1/2012 | Woo | G01S 5/0221 455/456.1 |
| 2012/0184302 A1* | 7/2012 | Kazmi | H04W 64/00 455/456.5 |
| 2013/0109405 A1* | 5/2013 | Siomina | H04W 64/00 455/456.1 |
| 2015/0215884 A1* | 7/2015 | Horvat | G01S 5/0294 370/328 |
| 2015/0319707 A1* | 11/2015 | Abdelmonem | H04L 5/006 455/522 |

OTHER PUBLICATIONS

Qualcomm Europe: "Broadcast of Positioning-related Assistance Data", 3GPP Draft; R2-095778, 3rd Generation Partnership Project (3GPP), Mobile Competence Centre ; 650, Route Des Lucioles ; F-06921 Sophia-Antipolis Cedex ; France, no. Miyazaki, Oct. 12, 2009, Oct. 12, 2009 (Oct. 12, 2009), XP050390266, 6 pages. [retrieved on Oct. 7, 2009].

* cited by examiner

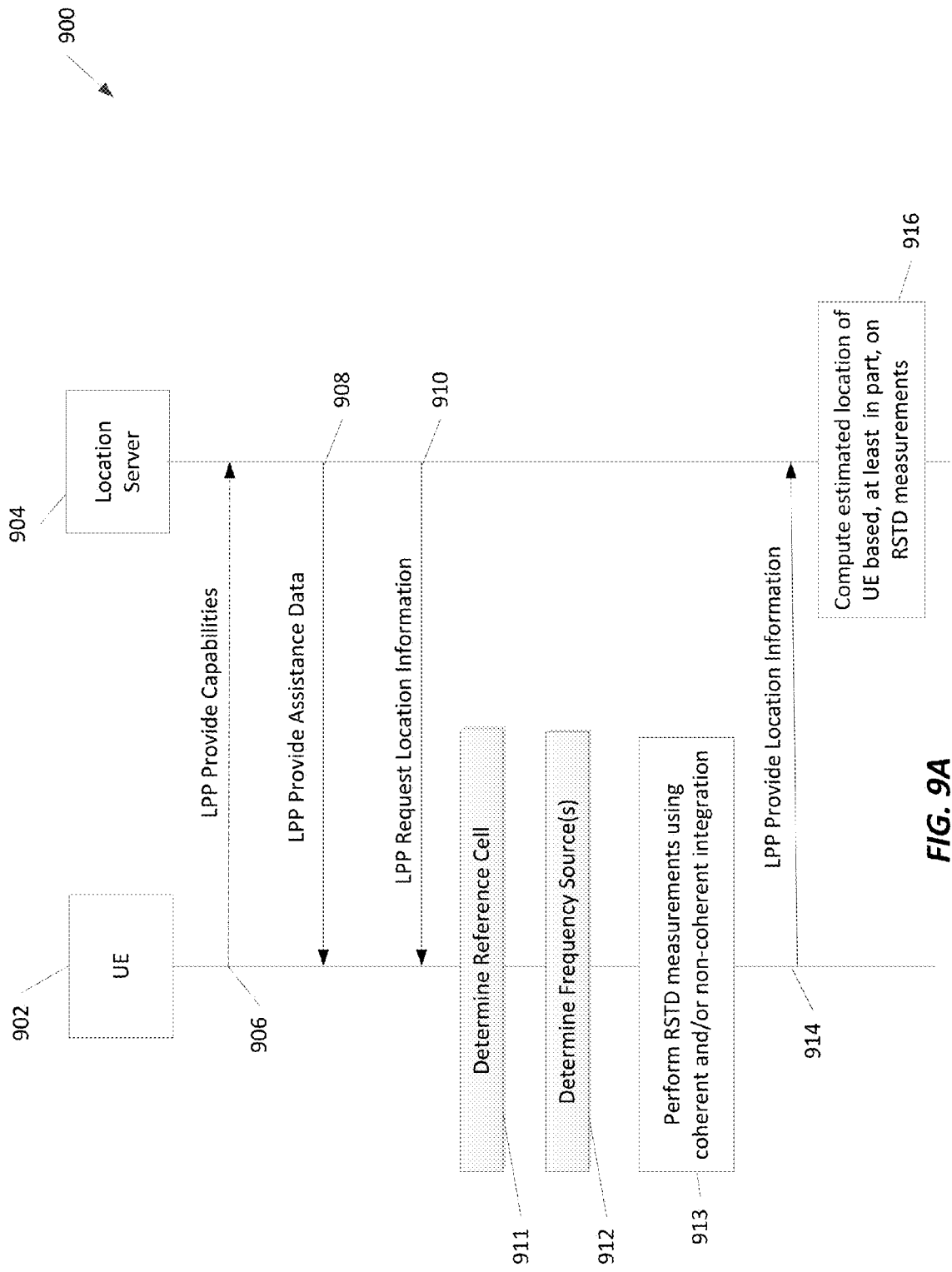

922 — obtaining one or more messages from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers 924 — determining a usage of coherent integration based, at least in part, on at least one of the frequency error characteristics, to measure a characteristic of a downlink signal for at least one of the plurality of cell transceivers according to the downlink terrestrial positioning method

FIG. 9B

SUPPORT OF DOWNLINK POSITIONING USING COHERENT AND NON-COHERENT SIGNAL ACQUISITION

CROSS-REFERENCE TO RELATED APPLICATIONS

This application claims the benefit of U.S. Provisional Application No. 62/211,611, entitled "Support of OTDOA Positioning Using Coherent and Non-Coherent Signal Acquisition," filed Aug. 28, 2015, which is assigned to the assignee thereof and which is expressly incorporated herein by reference.

BACKGROUND

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services.

More recently, Long Term Evolution (LTE) has been developed by the 3$^{rd}$ Generation Partnership Project (3GPP) as a radio access network technology for wireless communication of high-speed data and packetized voice for mobile phones and other mobile terminals. LTE has evolved from the Global System for Mobile Communications (GSM) system and from derivatives of GSM, such as Enhanced Data rates for GSM Evolution (EDGE), Universal Mobile Telecommunications System (UMTS), and High-Speed Packet Access (HSPA).

In North America, wireless communications systems, such as LTE, use a solution for Enhanced 911, or E911, that links emergency callers with the appropriate public resources. The solution attempts to automatically associate the caller, i.e., the caller's user equipment (UE), with a specific location, such as a civic address or geographic coordinates. Automatically locating the caller with high accuracy (e.g., with a distance error of 50 meters or less) and providing the location to a Public Safety Answering Point (PSAP) can increase the speed with which the public safety side can locate the required resources during emergencies, especially where the caller may be unable to communicate his/her location (e.g. does not know the location or is unable to speak adequately).

To locate a UE geographically, there are several approaches. One is to use some form of terrestrial radio location based on measurements made by a UE of signals transmitted by wireless network base stations and access points (APs). In cases where a measured base station is remote from a UE (e.g. several miles or more distant) or where there is strong interference from transmissions from other base stations, a UE may employ coherent or non-coherent integration over a period of time (e.g. 1 millisecond (ms) up to 100 ms) to acquire and measure a suitable reference signal from the base station. As is well known in the art, coherent integration, in which both the phase and amplitude of a signal are accumulated over time, can enable a better signal to noise ratio (S/N) and more accurate measurements—e.g. of a weak signal or a signal with strong interference. But, as may be observed, coherent integration may be dependent on accurate knowledge of the frequency and coding of the measured signal and may perform worse than non-coherent integration, in which just the power of a signal is accumulated over time, when frequency and/or coding are not precisely known. For example, coherent integration may perform worse than non-coherent integration for a UE that uses a frequency (or clock) source for integrating measurements that differs from the carrier frequency of the base station being measured (e.g. by a few parts per million (ppm)). In some situations, a UE may not know whether its frequency source is of sufficient accuracy to make coherent integration effective or whether greater measurement accuracy could be achieved by using non-coherent integration. Systems and methods that enable a UE to determine when to use coherent integration versus non-coherent integration to achieve improved or optimum measurement accuracy may thus be of benefit.

SUMMARY

Briefly, particular implementations described herein are directed to a method at a mobile device comprising: obtaining one or more messages from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and determining a usage of coherent integration, based on at least one of the frequency error characteristics to measure a characteristic of a downlink signal for at least one of the plurality of cell transceivers according to the downlink terrestrial positioning method.

Another particular implementation is directed to mobile device comprising: a wireless transceiver to transmit messages to and receive messages from a wireless communication network; and a processor coupled to the wireless transceiver configured to: obtain one or more messages received at the wireless transceiver from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and determine a usage of coherent integration, based on at least one of the frequency error characteristics to measure a characteristic of a downlink signal for at least one of the plurality of cell transceivers according to the downlink terrestrial positioning method.

Another particular implementation is directed to a non-transitory storage medium comprising computer-readable instructions stored thereon which are executable by a processor of a mobile device to: obtain one or more messages received from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and determine a usage of coherent integration, based on at least one of the frequency error characteristics to measure a characteristic of a downlink signal for at least one of the plurality of cell transceivers according to the downlink terrestrial positioning method.

Another particular implementation is directed to mobile device comprising: means for obtaining one or more messages from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and means for determining a usage of coherent integration, based on at least one of the frequency error characteristics to measure a characteristic of a downlink signal for at least one of the plurality of cell transceivers according to the downlink terrestrial positioning method.

Another particular implementation is directed to a method at a server comprising: transmitting one or more messages to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers.

Another particular implementation is directed to a server comprising: a communications subsystem; and one or more processors coupled to the communications subsystem, the one or more processors being configured to initiate transmission of one or more messages through the communications subsystem to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers.

Another particular implementation is directed to a storage medium comprising computer readable instruction stored thereon which are executable by one or more processors of a server to: initiate transmission of one or more first messages to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers.

Another particular implementation is directed to a server comprising: means for transmitting one or more messages to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers.

It should be understood that the aforementioned implementations are merely example implementations, and that claimed subject matter is not necessarily limited to any particular aspect of these example implementations.

BRIEF DESCRIPTION OF THE DRAWINGS

FIG. 9A is a message flow diagram of an example positioning procedure using OTDOA according to an embodiment.

FIG. 9B is a flow diagram of a process for determining a usage of a coherent integration in acquisition of a signal according to an embodiment.

Like numbers in different figures are used to indicate like elements such that a description for any element in one figure applies equally to the same numbered element in another figure.

DETAILED DESCRIPTION

Figure 1:
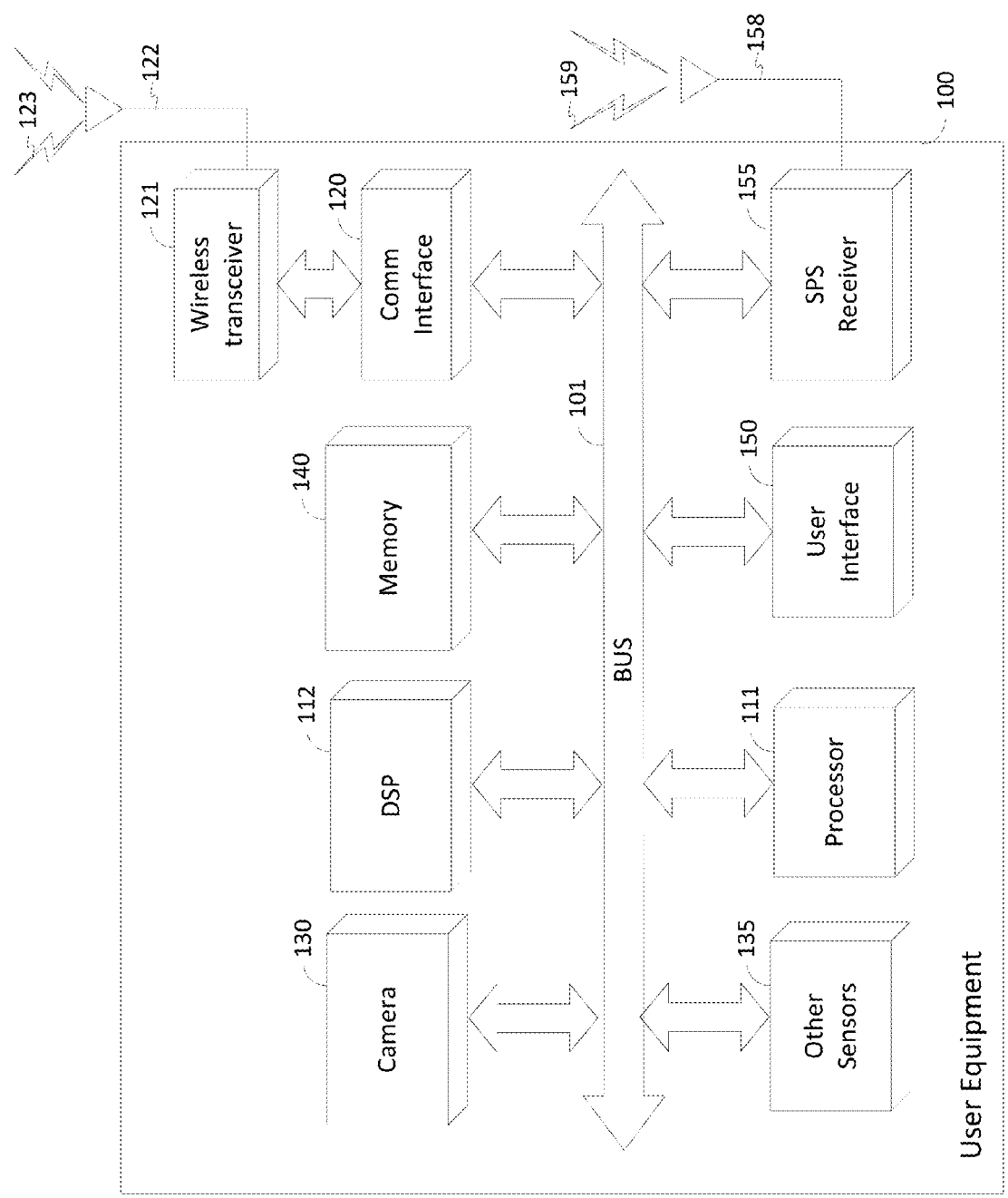
FIG. 1 is a block diagram of components of one embodiment of a user equipment.

To locate a UE geographically in a cellular telephony system, there are several approaches. One is to use some form of terrestrial radio location based on measurements made by a UE of signals transmitted by wireless network base stations and access points (APs) and/or based on measurements made by network elements (e.g., base stations and/or APs) of signals transmitted by the UE. Another approach is to use a Global Positioning System (GPS) receiver or Global Navigation Satellite System (GNSS) receiver built into the UE itself.

One terrestrial radio location method that is applicable to measurements of LTE base stations, referred to as evolved Node Bs (eNodeBs or eNBs), and that is standardized by 3GPP in 3GPP Technical Specifications (TSs) 36.211, 36.305, and 36.355 is Observed Time Difference of Arrival (OTDOA). OTDOA is a multilateration method in which the UE measures the time difference between specific signals, referred to as reference signals, received from one reference eNodeB and one or more neighbor eNodeBs. The UE may then either compute a location estimate itself from these measurements or report the measured time differences to a location server, such as an Enhanced Serving Mobile Location Center (E-SMLC) or a Secure User Plane Location (SUPL) Location Platform (SLP), which then computes an estimate of the UE's location. In either case, the measured time differences and knowledge of the measured eNodeBs' locations and relative transmission timing are used to calculate the UE's position.

Another position method that is similar to OTDOA (in measuring time differences between different base stations at a UE) is known as Advanced Forward Link Trilateration (AFLT) which may be used to locate a UE that is accessing a CDMA2000 network as defined by the $3^{rd}$ Generation Partnership Project 2 (3GPP2). Both OTDOA and AFLT may make use of information for the measured base stations and APs (e.g. to help a UE acquire and measure reference signals and/or to help compute a location estimate for the UE from the measurements). The information may include information regarding the locations (e.g., location coordinates) and transmission characteristics (e.g., transmission timing, transmission power, signal content and signal characteristics) of the measured base stations and APs and may be referred to as an almanac, a base station almanac (BSA), almanac data or BSA data. The observed time differences measured by a UE (e.g., for OTDOA or AFLT) may be used in conjunction with a known BSA for the measured base stations (e.g., eNodeBs) and/or APs to calculate a position for the UE either by the UE or by a location server such as an E-SMLC or SLP.

Techniques are discussed herein for supporting downlink positioning methods (also referred to as position methods), such as OTDOA and AFLT, by acquisition and measurement of downlink radio signals using coherent and non-coherent signal integration techniques. As is well known in the art, coherent integration is integration that includes integration of both the phase and amplitude of a signal, whereas non-coherent integration is integration that only includes integration of the power of a signal. While coherent integration can typically achieve a higher signal to noise ratio (S/N) which can enable higher measurement accuracy (e.g. of signal timing), it is also more sensitive than non-coherent integration (e.g. as shown later herein) to accurate knowledge of the timing and frequency of the signal being measured.

According to an embodiment, a wireless communication network may contain one or more cellular transceivers that each broadcast a Positioning Reference Signal (PRS) that may be distinct from the PRS broadcast by other nearby cellular transceivers due to use of a different frequency or different set of frequencies, different encoding, different times of transmission or some combination of these. A UE comprising a receiver may measure the PRS transmitted by a nearby cell transceiver and obtain, for example, a time of arrival (TOA) and/or a reference signal time difference (RSTD) measurement. In the case of an RTSD, the measurement may provide the difference in time of arrival between a PRS transmitted by a measured cell transceiver (referred to herein as a neighbor cell) and a PRS transmitted by some reference cell transceiver (referred to herein as a reference cell). The reference cell may be chosen by the UE or by a server to provide good signal strength at the UE such that the PRS can typically be accurately and quickly measured without any special assistance from a serving network. In some embodiments, the reference cell may be the serving cell for the UE.

In acquiring and measuring the PRS for any neighbor cell, a UE may be provided with assistance data by a serving network (e.g., by a location server in the serving network) that may assist in PRS acquisition and measurement. For example, for each neighbor cell that may need to be measured and for the reference cell, the assistance data may provide the cell identity (ID), the cell carrier frequency (or center frequency), the frequency or frequencies used for the PRS signal for the cell, any frequency hopping sequence for the PRS signal, the PRS code sequence (e.g., a sequence of symbols or bits for the PRS) and the PRS transmission times. For a neighbor cell, the assistance data may also provide a time offset for PRS transmission by the neighbor cell relative to PRS transmission from the reference cell and an expected approximate RSTD measurement based on an approximate UE location such as that inferred from the UE's serving cell. A UE may then typically measure the PRS (e.g., a TOA for the PRS) for any neighbor cell by integrating a received signal at the neighbor cell carrier frequency according to the provided frequency or frequencies for the PRS signal and the sequence of provided PRS transmission times. Since the UE will not know the exact TOA in advance, the UE may correlate the integrated signal with the provided PRS encoding for the cell being measured for different possible TOAs and may measure a TOA that corresponds to the earliest received correlation peak, to eliminate later correlation peaks caused by multipath signals. Such signal integration and measurement corresponds partly to blind measurement since the UE may not have direct visibility to the measured cell's signals (e.g. may not be able to directly detect the measured cell's carrier frequency or demodulate and decode signal content). Since a measured cell's carrier frequency forms the basis for any PRS signal and has to be accurately known in order to acquire and measure the PRS signal using integration techniques, a UE may have to rely on some other frequency or clock source to predict the carrier frequency. Since a UE's own clock source is typically inaccurate and unstable, a UE may conveniently use the reference cell, or the serving cell if different to the reference cell, as a source of an accurate frequency via frequency lock loop. The UE can then convert the reference cell or serving cell frequency into the neighbor cell frequency if the two are different and measure the neighbor cell. However, frequency errors in the reference (or serving) cell and/or the neighbor cell may place limitations on this technique. Similarly, any motion of the UE may introduce an error in the form of a Doppler shift in the received frequency. The techniques discussed herein may enable a UE to use coherent and/or non-coherent integration in an improved or even optimum manner when such frequency errors are present.

To assist a UE to accurately measure the PRS of a number of neighbor cells for OTDOA, a serving network (e.g. a location server) may provide information to the UE concerning the frequency accuracy for the reference cell and/or the frequency accuracy for each neighbor cell. A UE may then use such information to help determine a new reference cell if preferred by the UE (e.g. if any reference cell initially chosen by the network or by a location server provides poor signal reception at the UE). A UE may also use such information to help determine an optimum period for using coherent and/or non-coherent integration while measuring the PRS from neighbor cells. The frequency accuracy information that is provided for each cell by a serving network (e.g., by a location server) may comprise (i) the maximum expected frequency error (e.g., in units of ppm) for the cell, (ii) a class of frequency error (e.g., which may correspond to some range of frequency error in units of ppm), or (iii) a single flag indicating whether or not a particular cell can be used as a reference cell (e.g., with an understanding that suitability for use as a reference cell corresponds to having a frequency error that is below some maximum threshold).

In the subsequent description herein of the method and techniques to support measurement of different reference signals using coherent and non-coherent integration, the OTDOA position method defined by 3GPP for LTE in 3GPP Technical Specifications (TSs) 36.211, 36.305, and 36.355 is assumed unless otherwise stated. However, it will be appreciated that the method and techniques may also be applicable to other position methods supported by a UE that rely on accurate measurement of aspects of reference signals or other downlink signals received from base stations and APs. These other methods may include AFLT, enhanced Cell ID (ECID), WiFi positioning (e.g., based on downlink signals according to IEEE 802.11x standards) and positioning for short range nodes (SRNs) such as Bluetooth® Low Energy (BTLE) beacons.

With OTDOA as described in more detail later on herein, a PRS signal is transmitted in one or more consecutive LTE subframes each of duration 1 ms. The set of consecutive LTE subframes in which a PRS signal is transmitted within a cell is referred to as a positioning occasion. In a current version of OTDOA, as defined for the LTE Positioning Protocol (LPP) in 3GPP TS 36.355, a PRS positioning occasion can comprise between one and six consecutive subframes. However, more subframes (e.g. up to 160 consecutive subframes) may be allowed in later versions of LPP.

According to an embodiment, a location server (e.g. an E-SMLC or SLP) may indicate to a UE via new OTDOA assistance data which cells have small carrier frequency errors versus larger errors. This can be done in several alternative ways—e.g. by (i) providing a carrier frequency maximum error value for each cell transceiver, (ii) providing a carrier frequency error class for each cell transceiver or (iii) indicating which cell transceivers can and cannot be used as a reference cell. A UE may then ensure, whenever possible, that the cell transceiver used as a carrier frequency source (e.g. the reference cell) has a low carrier frequency error. A UE can also determine an improved or optimal coherent integration time for a PRS transmitted from a neighboring cell transceiver based, at least in part, on any provided carrier frequency error for the neighboring cell transceiver and a number of consecutive PRS subframes that the neighbor cell may transmit in a particular PRS positioning occasion. As is well known, using coherent integration can improve signal quality (e.g. S/N), leading to greater measurement accuracy (e.g. for a TOA or RSTD measurement) which may result in higher location accuracy compared to using non-coherent integration to measure a PRS signal if coherent integration conditions are suitable (e.g., carrier frequency known with accuracy). Therefore, particular implementations described herein may improve OTDOA performance by attempting to use coherent PRS integration whenever permitted by the indicated maximum errors in the carrier frequencies for the reference cell and each neighbor cell, as described in more detail below.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "mobile device", a "subscriber terminal", a "subscriber station", a "user terminal" or UT, a "mobile terminal", a "mobile station", a SUPL enabled terminal (SET), a target device, a target UE, and variations thereof. A UE may be a cell phone, smartphone, laptop, tablet, asset tag, PDA, PC card, compact flash device, external or internal modem, a device designed for machine to machine (M2M) communication, or any other device that is enabled to communicate wirelessly with other UEs and/or other entities via direct means and/or via one or more networks or one or more network elements. Generally, UEs can communicate with a core network via a RAN, and through the core network (or sometimes through the RAN) the UEs can be connected with external networks such as the Internet. The RAN may support wireless communication from UEs using cellular based radio technologies such as GSM, UMTS and LTE as defined by 3GPP or CDMA2000 as defined by 3GPP2. A UE may also employ other mechanisms for connecting to the core network and/or the Internet such as over wired access networks, WiFi networks (e.g., based on IEEE 802.11, etc.), Bluetooth networks and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.).

A location that is determined or estimated for a UE may be referred to as a location estimate, position, position estimate, position fix or fix or by some other name and may comprise location coordinates such as a latitude, longitude and possibly altitude. In some cases, location coordinates may be local and may then sometimes be referred to as x, y and z (or X, Y and Z) coordinates where an x (or X) coordinate refers to a horizontal distance in a particular direction (e.g. a distance East or West of a given known origin), a y (or Y) coordinate refers to a horizontal distance at right angles to the x (or X) direction (e.g. a distance North or South of a given known origin) and a z (or Z) coordinate refers to a vertical distance (e.g. a distance above or below local ground level). When computing the location of a UE, it is common to solve for local x, y and possibly z coordinates and then, if needed, convert the local coordinates into absolute ones (e.g. for latitude, longitude and altitude above or below mean sea level). A location of a UE may also be provided as a civic location and may then comprise a postal address (e.g. country, state, city, street and street number) and/or some other verbal and/or numeric identification such as the designation of a building, a name of a well known site or landmark, a room number, apartment number or suite number etc.

Referring to FIG. 1, a user equipment (UE) 100 is illustrated for which various techniques herein can be utilized. The UE 100 includes a processor 111 (or processor core) and memory 140. The UE 100 may optionally include a trusted environment operably connected to the memory 140 by the public bus 101 or a private bus (not shown). The UE 100 may also include a communication interface 120 and a wireless transceiver 121 configured to send and receive wireless signals 123 via a wireless antenna 122 over a wireless network. The wireless transceiver 121 is connected to the bus 101 via the communication interface 120. Here, the UE 100 is illustrated as having a single wireless transceiver 121. However, a UE 100 can alternatively have multiple wireless transceivers 121 and/or multiple wireless antennas 122 to support multiple communication standards such as WiFi, Code Division Multiple Access (CDMA), Wideband CDMA (WCDMA), Long Term Evolution (LTE), BLUETOOTH short-range wireless communication technology, etc. In some implementations, wireless antenna 122 may comprise multiple antenna elements or an antenna array.

The communication interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, control information, data, etc. The wireless transceiver 121 and/or communication interface 120 may be used to perform, or help perform, coherent and non-coherent integration of received wireless signals 123 according to the techniques described herein.

The UE 100 may also include a user interface 150 (e.g., display, Graphical User Interface (GUI)), and a Satellite Positioning System (SPS) receiver 155 that receives SPS signals 159 (e.g., from GPS or other GNSS satellites) via an SPS antenna 158 (e.g. which may be the same as wireless antenna 122). The SPS receiver 155 can receive and measure signals from a single global navigation satellite system (GNSS) or from multiple such systems. A GNSS can include, but is not limited to, Global Positioning System (GPS), Galileo, Glonass, Beidou (Compass), etc. SPS satellites are also be referred to as satellites, space vehicles (SVs), etc. The SPS receiver 155 measures the SPS signals 159 and may use the measurements of the SPS signals 159 to determine the location of the UE 100. The processor 111, memory 140, Digital Signal Processor (DSP) 112 and/or specialized processor(s) (not shown) may also be utilized to process the SPS signals 159, in whole or in part, and/or to calculate the location of the UE 100, in conjunction with SPS receiver 155. Alternatively, UE 100 may support transfer of the SPS measurements to a location server (e.g. E-SMLC or SLP) that computes the UE location instead. Storage of information from the SPS signals 159 or other location signals is performed using a memory 140 or registers (not shown). While only one processor 111, one DSP 112 and one memory 140 are shown in FIG. 1, more than one of any, a pair, or all of these components could be used by the UE 100. The processor 111 and DSP 112 associated with the UE 100 are connected to the bus 101.

The memory 140 can include a non-transitory computer-readable storage medium (or media) that stores procedures (e.g. procedures to support the techniques described herein) as one or more instructions or code which are retrievable for execution by DSP(s) 112, general purpose processor(s) 111, or both. Media that can make up the memory 140 include, but are not limited to, RAM, ROM, FLASH, disc drives, etc. In general, the functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the UE 100 may be performed in whole or in part in hardware.

A UE 100 can estimate its current position within an associated system using various techniques, based on information obtained for or from other communication entities (e.g. signal measurements for other entities and/or information explicitly provided by other entities) and/or information available to the UE 100 (e.g. inertial sensor measurements). For instance, a UE 100 can estimate its position using signal measurements obtained for base stations (e.g. LTE eNodeBs), access points (APs) associated with one or more wireless local area networks (WLANs), personal area networks (PANs) utilizing a short-range wireless communication technology such as BLUETOOTH or ZIGBEE®, etc., Global Navigation Satellite Systems (GNSS) or other Satellite Positioning System (SPS) satellites, and/or map data obtained from a map server or location server. In some cases, a location server, which may be an E-SMLC, SLP or Standalone Serving Mobile Location Center (SAS), may provide assistance data to a UE 100 to enable or assist the UE 100 to make location related measurements (e.g. measurements of WLAN APs, cellular base stations, GNSS satellites). The UE 100 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites or the precise location coordinates of WLAN APs and/or cellular base stations for use in OTDOA and AFLT processes).

In one embodiment, the UE 100 may include a camera 130 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 130 may be configured to obtain and provide image information to assist in positioning of the UE 100. In an example, one or more external image processing servers (e.g. remote servers) may be used to perform image recognition and position estimation processes. The UE 100 may include other sensors 135 which may also be used to compute, or used to assist in computing, a location for the UE 100. Sensors 135 may include inertial sensors (e.g. accelerometers, gyroscopes, magnetometers, compass) as well as a barometer, thermometer, hygrometer and/or other sensors.

Figure 2:
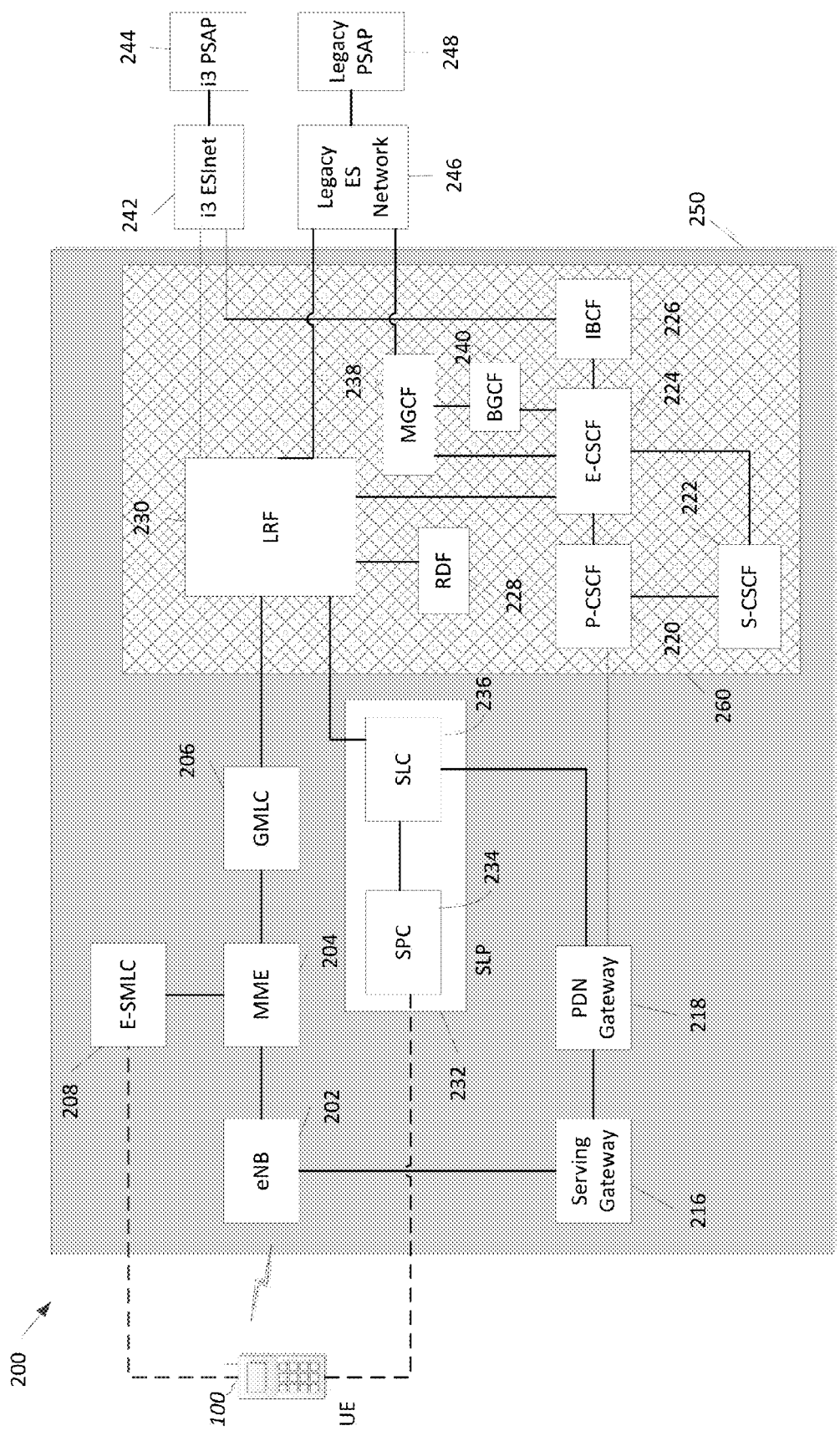
FIG. 2 is an example architecture for terrestrial positioning with 3GPP long term evolution (LTE) access.

Referring to FIG. 2, with further reference to FIG. 1, an architecture 200 for supporting positioning of a UE 100 with 3GPP LTE access for a network 250 is shown. The network 250 may be an Evolved Packet System (EPS) that supports LTE access (e.g. by the UE 100) and possibly other access types (not shown in FIG. 2) such as CDMA2000, Wideband CDMA (WCDMA) and/or WiFi. A UE 100 may communicate with a serving eNodeB 202 in a radio access network (RAN) to obtain communication services from the network 250. The RAN may include other network entities not shown in FIG. 2 for simplicity and may also be referred to as an Evolved Universal Terrestrial Radio Access Network (E-UTRAN). The eNB 202 may also be referred to as a Node B, a base station, an access point, etc. The UE 100 may (i) receive signals from eNB 202 and from other base stations (e.g. other eNBs) and APs (not shown FIG. 2) in network 250; (ii) obtain the identities of the source eNBs and other base stations and APs or of the source cells from the received signals and/or (iii) obtain measurements of the received signals such as measurements of TOA, RSTD for OTDOA positioning, pilot phase for AFLT positioning, and/or signal strength (e.g. received signal strength indication (RSSI)), signal quality (e.g. S/N), angle of arrival (AOA), and/or signal round trip propagation time (RTT) for ECID positioning. The eNB, base station, AP and/or cell identities and the different signal measurements may be used to derive a location estimate for UE 100 (e.g. by UE 100 or by a location server such as E-SMLC 208 or SLP 232). While only one eNB 202 is depicted in FIG. 2, the architecture 200 (e.g. network 250) may include multiple eNBs and/or other base stations and/or APs, each with one or more antenna elements.

The eNB 202 may communicate with a serving MME 204 for UE 100, which may perform various control functions such as mobility management, gateway selection, authentication, bearer management, etc. MME 204 may communicate with an E-SMLC 208 and with a Gateway Mobile Location Center (GMLC) 206. The E-SMLC 208 may support UE-based, UE-assisted, network-based and/or network-assisted positioning methods for UEs including UE 100 and may support (e.g. may be connected to) one or more MMEs. E-SMLC 208 may support the 3GPP control plane location solution for LTE access as defined in 3GPP TSs 23.271 and 36.305. The E-SMLC 208 may also be referred to as a location server (LS), a Stand Alone SMLC (SAS), etc. The GMLC 206 may perform various functions to support location services and provide services such as subscriber privacy, authorization, authentication, billing, etc. A Location Retrieval Function (LRF) 230 may communicate with GMLC 206 and may route or help route an Internet Protocol (IP) based emergency call (e.g. from UE 100) to or towards an Emergency Services Network and a Public Safety Answering Point (PSAP) such as the i3 Emergency Services IP network (ESInet) 242 and i3 PSAP 244 defined by the National Emergency Number Association (NENA), as well as legacy systems such as the legacy Emergency Services (ES) network 246 and the legacy PSAP 248. LRF 230 may also support location requests from or on behalf of PSAPs (e.g. PSAPs 244 and 248) for UEs (e.g. UE 100) that are making emergency calls and may obtain locations for these UEs and return the locations to or towards the requesting PSAPs.

In order to support the routing and location functions that LRF 230 performs, LRF 230 may be configured to request the locations of different target UEs (e.g. UE 100) from a GMLC such as GMLC 206. In that case, GMLC 206 may transfer any location request for a target UE (e.g. UE 100) to an MME such as MME 204 which may transfer the request to an E-SMLC such as E-SMLC 208. The E-SMLC (e.g. E-SMLC 208) may then obtain location related measurements for the target UE from the serving eNB for the target UE (e.g. eNB 202) and/or from the target UE (e.g. UE 100), compute or verify any location estimate for the target UE and return the location estimate via the MME and GMLC (e.g. MME 204 and GMLC 206) to LRF 230. LRF 230 may also or instead be configured to request the locations of different target UEs (e.g. UE 100) from an SLP such as SLP 232. SLP 232 may include a SUPL Positioning Center (SPC) 234 and a SUPL Location Center (SLC) 236, and may be configured to communicate location information with the LRF 230 and support the SUPL user plane location solution defined by the Open Mobile Alliance (OMA) in order to obtain the locations of UEs such as UE 100.

In order to support positioning of a UE such as UE 100, E-SMLC 208 and SLP 232 may each use the LTE Positioning Protocol (LPP) defined in 3GPP 36.355 and/or the LPP Extensions (LPPe) protocol defined by OMA in which LPP and/or LPPe messages are exchanged between E-SMLC 208 or SLP 232 and the target UE (e.g. UE 100) that is being positioned. In the case of E-SMLC 208, LPP and/or LPPe messages exchanged with a target UE may be transferred as signaling via the serving MME and serving eNB for the target UE (e.g. via eNB 202 and MME 204 if the target UE is UE 100). In the case of SLP 232, LPP and/or LPPe messages exchanged with a target UE may be transferred as data using IP transport via a Packet Data Network (PDN) Gateway, Serving Gateway and serving eNB for the target UE (e.g. PDN Gateway 218, Serving Gateway 216 both described next and eNB 202 if the target UE is UE 100). In the case that LPPe messages are exchanged, one LPPe message may be embedded inside one LPP message such that both protocols are used in combination. The combined protocol may then be referred to as LPP/LPPe.

A Serving Gateway 216 may perform various functions related to IP data transfer for UEs such as data routing and forwarding, mobility anchoring, etc. A PDN Gateway 218 may perform various functions such as maintenance of data connectivity for UEs, IP address allocation, IP anchoring, provision of access to other IP networks, etc. An IP Multimedia Subsystem (IMS) 260 for network 250 may include various network entities to support IMS services such as Voice-over-IP (VoIP) calls and VoIP emergency calls. The IMS 260 may include a Proxy Call Session Control Function (P-CSCF) 220, a Serving Call Session Control Function (S-CSCF) 222, an Emergency Call Session Control Function (E-CSCF) 224, a Breakout Gateway Control Function (BGCF) 240, a Media Gateway Control Function (MGCF) 238, an Interconnection Border Control Function (IBCF) 226, a Routing Determination Function (RDF) 228 and the LRF 230.

In operation, the network 250 may utilize LTE interfaces and protocols for control plane location. The LPP or the combined LPP/LPPe protocol may be used over the Uu interface between the UE 100 and the eNB 202 for positioning of the UE 100 by the E-SMLC 208. LPP/LPPe messages may be transferred (as previously described) between the UE 100 and the E-SMLC 208 via the MME 204 and the eNB 202 for the UE 100 as described in 3GPP TSs 23.271 and 36.305. The E-SMLC 208 may be configured to request (e.g. by sending an LPP/LPPe Request Location Information message to UE 100), and the UE 100 may be configured to provide (e.g. by sending an LPP/LPPe Provide Location Information message to E-SMLC 208) the signal measurements (e.g. RSSI, RTT, RSTD measurements) and identities of visible cells.

In an alternative embodiment, either (i) the LPP protocol alone without LPPe or (ii) the RRC protocol defined in 3GPP 36.331 may be used over the Uu interface between the UE 100 and the serving eNB 202 for positioning of the UE 100 by the E-SMLC 208. In the case of LPP (alternative (i)), LPP messages may be transferred between the UE 100 and the E-SMLC 208 via the MME 204 and the serving eNB 202 for the UE 100 as described in 3GPP TSs 23.271 and 36.305. In the case of RRC (alternative (ii)), RRC messages may be transferred between the UE 100 and the serving eNB 202 and LTE Positioning Protocol A (LPPa) messages (defined in 3GPP TS 36.455) may be transferred between eNB 202 and E-SMLC 208 via the MME 204 for the UE 100 as described in 3GPP TSs 23.271 and 36.305. In an example, the E-SMLC 208 may be configured to request (e.g. by sending an LPP Request Location Information message to UE 100 or an LPPa request message to eNB 202 which may cause eNB 202 to send an RRC request message to UE 100), and the UE 100 may be configured to provide (e.g. by sending an LPP Provide Location Information message to E-SMLC 208 or an RRC response to eNB 202 which causes eNB 202 to send an LPPa response to E-SMLC 208) the signal measurements (e.g., RSTD measurements) and identities of visible cells.

A Location Services (LCS) Application Protocol (LCS-AP) defined in 3GPP TS 29.171 may be used over an SLs interface between the MME 204 and the E-SMLC 208 to enable the MME 204 to request location information for the UE 100 from the E-SMLC 208 using the 3GPP control plane solution. An Evolved Packet Core (EPC) Location Services (LCS) Protocol (ELP) defined in 3GPP TS 29.172 may be used over an SLg interface between the MME 204 and the GMLC 206 to enable the GMLC 206 to request and obtain location information for the UE 100 using the 3GPP control plane solution.

The network 250 may also or instead utilize interfaces and protocols for SUPL User Plane Location. A Lup interface as defined in OMA publication OMA-AD-SUPL-V2_0 may be used between the UE 100 (referred to as a SUPL Enabled Terminal (SET)) and the SLP 232 to support positioning of the UE 100 using the OMA SUPL user plane solution. The Lup interface enables exchange of User Plane Location Protocol (ULP) messages, defined in OMA TS OMA-TS-ULP-V2_0_3, between the UE 100 and the SLP 232. The SLP 232 may be a Home SLP (H-SLP) for the UE 100 and reside in the home network of a UE (e.g. applicable to UE 100 if network 250 is the home network for UE 100) or may be a Discovered SLP (D-SLP) or Emergency SLP (E-SLP). A D-SLP may be used to position UE 100 in any network (e.g. applicable if network 250 is not the home network for UE 100) and an E-SLP may be used to position UE 100 if UE 100 is establishing or has established an emergency call (e.g. a VoIP emergency call via IMS 260 to i3 PSAP 244 or legacy PSAP 248). SLP 232 is split into the SLC 236 and the SPC 234 which may be separate logical functions of a single physical SLP 232 or separate physical entities. The SLC 236 is configured to establish and control a SUPL session with the UE 100. The SPC 234 is configured to obtain a location of the UE 100. One endpoint for any ULP message is then either the SLC 236 or the SPC 234 depending on whether the ULP message is used for control and service provision or for positioning. In the case of the UE 100 (e.g., with LTE access), the ULP messages used for positioning typically each encapsulate one or more LPP messages. Each encapsulated LPP message can further encapsulate one LPPe message, thereby enabling exchange of LPP and/or LPP/LPPe positioning protocol messages between UE 100 and SLP 232 as previously described. To support location of UE 100, LPP or LPP/LPPe may be used to enable the SPC 234 to request, and the UE 100 to return the same information (e.g. cell identities and RSTD measurements) as described above for control plane location.

Figure 3:
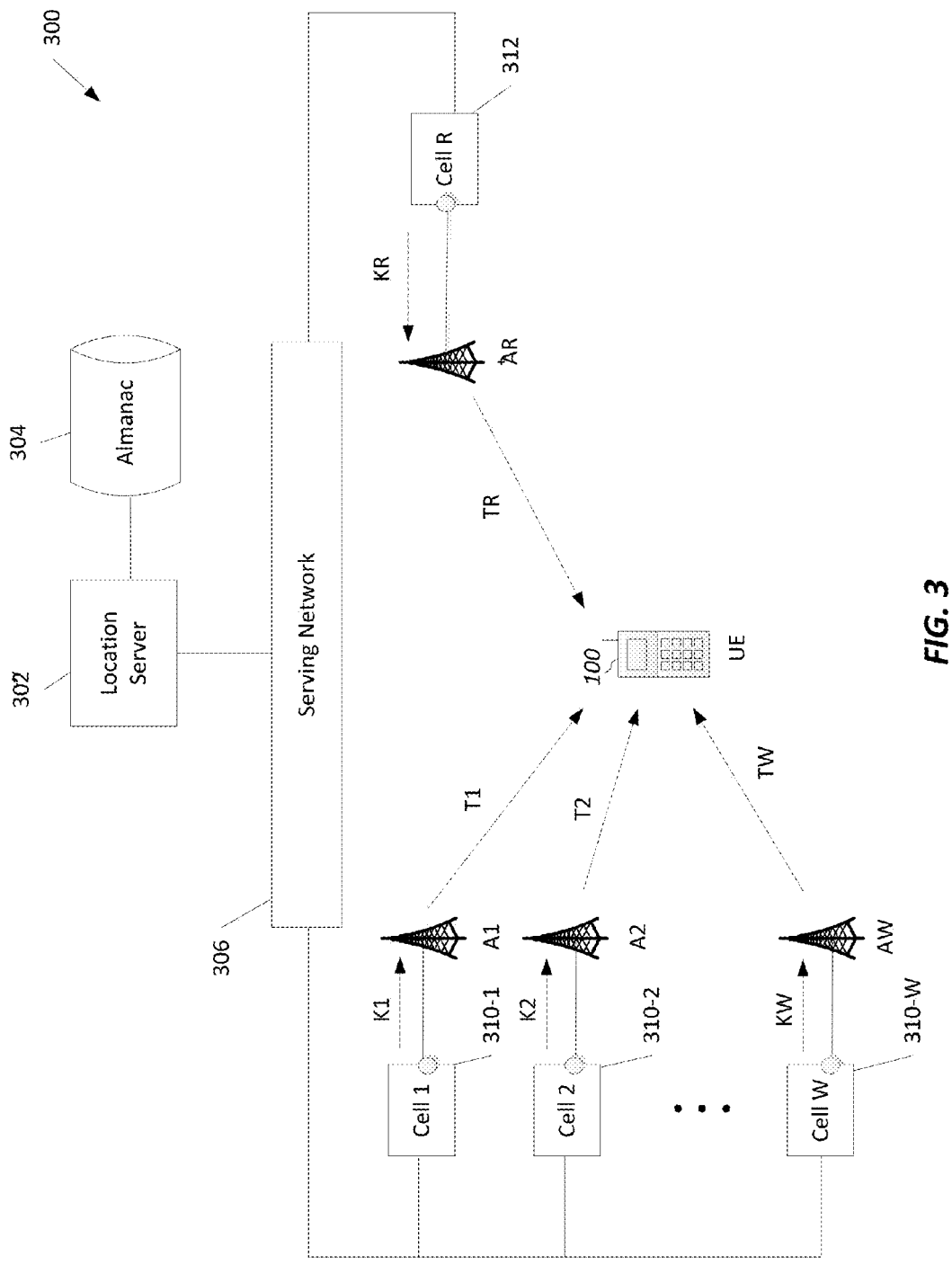
FIG. 3 is a high level architecture of an example wireless communication network for support of positioning according to some embodiments.

FIG. 3 shows a wireless communication system 300 employing LTE access and synchronized signal transmission (e.g. synchronized PRS transmission) that may be used to locate a UE using the OTDOA position method. The wireless communication system 300 includes a location server 302 and an almanac 304. The location server 302 and almanac 304 may be included as part of a serving network 306 or may be attached to or reachable from a serving network 306. For example, the serving network 306 may correspond to network 250 in FIG. 2, and the location server 302 may correspond to E-SMLC 208 or to SLP 232 in network 250 or may be another location server such as an SAS. The serving network 306 may include one or more cell transceivers labelled cell 1 310-1, cell 2 310-2, cell W, 310-W, and cell R 312. There may be other cell transceivers not explicitly shown in FIG. 3 such as cell transceivers n 310-n with n between 3 and W−1. A cell transceiver is considered herein to comprise a base station or AP (e.g. an eNodeB) that supports transmission and reception in one particular cell. Sometimes, a base station or AP (e.g. eNB) will support transmission and reception in several cells (e.g. cell sectors) using the same transceiver and possibly the same antenna(s). In that case, each of the supported cells is considered to have its own logically distinct cell transceiver. The term cell is sometimes used herein to refer to a cell transceiver—e.g. such as when referring to a cell transceiver n 310-n as cell n 310-n. Any one of the cell transceivers (e.g. cell R 312) may correspond to (or be part of) eNB 202 in FIG. 2. Each of the cell transceivers may be operably connected to one or more antennas. The antennas comprise A1, A2, . . . AW in the case of cell transceivers 310-1, 310-2 . . . 310-W, respectively, and AR in the case of cell transceiver R 312. Each antenna may comprise one or more antenna elements.

An almanac 304 represents a database or database structure which may belong to serving network 306 and/or to location server 302 and may, in some embodiments, be part of location server 302 (e.g. contained in a non-transitory storage medium in location server 302). Almanac 304 is configured to store identification and location parameters for the cell transceivers and antennas within the serving network 306 and may comprise a BSA of the type previously described here.

With synchronized signal transmission, the serving network 306 can employ a set of synchronization points (exemplified by the small circles in FIG. 3), one for each antenna A1, A2, . . . , AW and AR. Each synchronization point corresponds to a location along the signal transmission path for any signal supplied to and transmitted by one antenna at which the signal timing is synchronized exactly or almost exactly to a common time (e.g., common GPS time) that is applicable to all the synchronization points. In the case of LTE, synchronization for each signal can synchronize the start of each new set of 1024 LTE downlink system frames, the start of each 10 ms LTE radio frame or just the start of each new 1.0 ms LTE subframe to the same time (e.g. same global time) for each cell and for each radio antenna in each cell if a cell uses multiple radio antennas to broadcast duplicates of the same signal. A synchronization point may correspond to signal transmission at an antenna or to signal propagation past some point prior to reaching the antenna such as a signal output jack from a cell transceiver or an intermediate signal amplifier.

In particular implementations as discussed below, UE 100 may receive messages from location server 302 comprising positioning assistance data including, for example, identifiers for a plurality of cell transceivers (e.g., including cell 1, cell 2, . . . , cell W and cell R). Furthermore, for one or more of the identified cell transceivers, the positioning assistance data may further specify a frequency error characteristic. In a particular implementation, a frequency error characteristic may be indicative of an accuracy, error or uncertainty for a carrier frequency of a PRS being transmitted from the corresponding cell transceiver. UE 100 may then determine whether to apply coherent and/or non-coherent integration to acquire a PRS transmitted by a cell transceiver based, at least in part, on the frequency error characteristic (e.g., of an expected carrier frequency of a downlink signal) corresponding to the cell transceiver.

In the example in FIG. 3, the location server 302 may instruct UE 100 to perform OTDOA measurements using cell R 312 as a reference cell and cells 310-1, 310-2, . . . , 310-W as neighbor cells and to return the OTDOA RSTD measurements to the location server 302. The Line of Sight (LOS) signal propagation time from each antenna to the UE 100 is denoted as Tn for each antenna An and as TR for the reference cell antenna AR. The UE 100 may then measure up to W RSTDs between the reference cell R 312 and each of the W neighbor cells (e.g., cells 310-1, 310-2, . . . , 310-W). The W RSTDs (if measured precisely and correctly and if there is no multipath) will be related to the signal propagation delays from the different antennas to the UE 100 and to the signal propagation delays inside the network to the different antennas by the following equation (which can be inferred from the arrangement shown in FIG. 3).

$$RSTDn=(Tn+Kn)-(TR+KR)(1\leq n\leq W) \quad (1)$$

Here RSTDn is the RSTD measurement between antenna AR for the reference cell R and antenna An for each neighbor cell n. Kn is the added internal signal propagation delay for antenna An from the point of network signal synchronization for antenna An to the antenna An (e.g. including propagation along any transmission feeders, signal amplifiers and other elements in the transmission path to antenna An). If the synchronization point for antenna An is antenna An, then Kn is zero. Typically, Kn may be treated as constant and can be measured and/or calculated by the operator for serving network 306. Similarly, KR is the added internal signal propagation delay for antenna AR from the point of network signal synchronization for antenna AR to antenna AR. KR may also be normally treated as constant and capable of being measured and/or calculated by a network operator. For a network in which OTDOA (e.g. PRS) signals are not synchronized but where transmission time differences between different antennas can be measured or calculated, the parameters Kn and KR can represent the difference in transmission time from each antenna An and AR and some universal time like UTC time or GPS time.

In order to solve for the X,Y,Z coordinates of a location of UE (e.g. with X being a latitude, Y a longitude and Z an altitude or X,Y,Z being local Cartesian coordinates), the following equations can be used:

$$[(Xn-x)^2+(Yn-y)^2+(Zn-z)^2]^{1/2}-[(XR-x)^2+(YR-y)^2+(ZR-z)^2]^{1/2}=c(Tn-TR)(1\le n\le W) \quad (2)$$

Where:
c=signal propagation speed over the air interface (i.e. light speed);
Xn, Yn, Zn=X,Y,Z coordinates of antenna An ($1\le n\le W$);
XR, YR, ZR=X,Y,Z coordinates of antenna AR;
x, y, z=X,Y,Z coordinates of the UE.

Equation (2) can be solved for the x,y,z coordinates of the UE 100 by using equation (1) to provide the values for the (Tn−TR) terms in equation (2) from the RSTD measurements. If at least three independent RSTD measurements are available, the x,y,z coordinates can be obtained. For simplification in some cases, the Z coordinates can be ignored (e.g. by assuming all Z coordinates to be equal) which enables value for the UE 100 x,y coordinates to be obtained from two independent RSTD measurements. When more than a minimum number of RSTD measurements are available, a method of least squares or some similar method can be used to obtain the x,y,z or x,y coordinates for UE 100 with minimum errors. It should be noted that while the techniques as described above may be applied by a location server 302, the techniques can also be used at a UE 100 to calculate its location if a location server 302 and/or other network entity (e.g. a base station) provides the UE 100 with the information to enable performing a location computation such as the location coordinates of the reference and neighbor eNBs and the internal signal propagation delays Kn and KR (e.g. in the form of assistance data such as BSA). A critical portion of the location determination technique, that limits the accuracy of the resulting x,y,z or x,y coordinates is the accuracy of the RSTD measurements obtained by the UE 100. For this reason, use of coherent and/or non-coherent integration for the RSTD measurements over a long enough period may be important.

Figure 4:
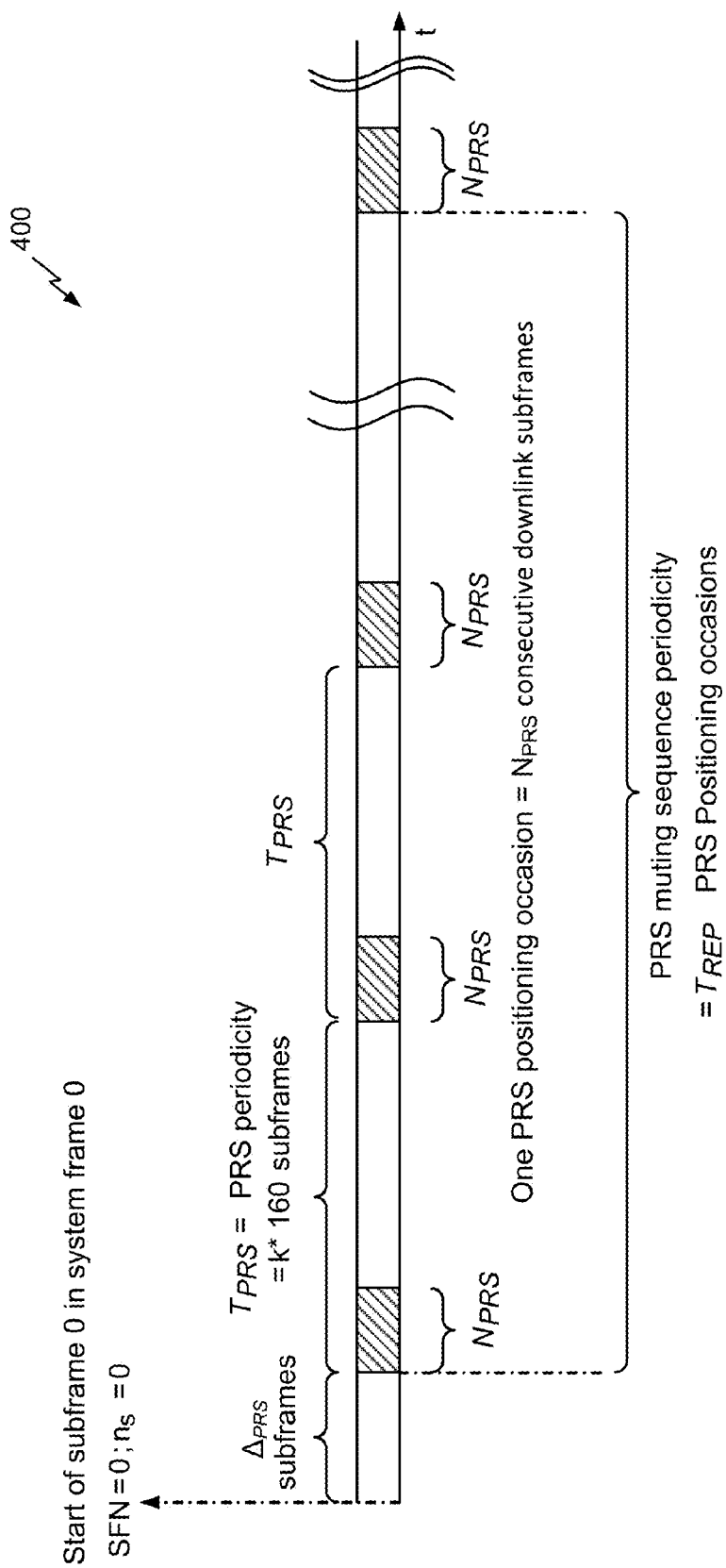
FIG. 4 shows an exemplary PRS duty cycle for OTDOA positioning.

FIG. 4 shows a time sequence 400 of an exemplary PRS duty cycle for OTDOA positioning. FIG. 4 illustrates a sequence of LTE subframe transmissions from one cell transceiver (e.g. eNB 202, cell R 312, cell n 310-*n*) starting with transmission at subframe zero in a system frame with system frame number (SFN) zero and extending to transmission from the last subframe of the system frame with SFN equal to 1023 (on the far right in FIG. 4 and not specifically shown in FIG. 4). In LTE in Frequency Division Duplex (FDD) mode, each LTE subframe has a duration of one millisecond (1 ms) and each system frame is composed of 10 subframes and has a duration of 10 ms. System frames can also be referred to as radio frames or simply as frames. Consecutive system frames are numbered from 0 to 1023, after which the numbering restarts again from zero for subsequent system frames. Therefore, FIG. 4 shows transmission over the longest set of subframes that can be individually and distinctly referenced (e.g. via subframe and system frame numbering) for LTE. In FIG. 4, increasing time is represented by the horizontal lines going from left to right. Groups of consecutive subframes that are used to transmit PRS, and that are referred to in 3GPP TSs (e.g., in 3GPP TS 36.211 and 36.355) as "PRS positioning occasions", are represented in FIG. 4 by the diagonally striped rectangles.

As defined by 3GPP (e.g., in TS 36.211), the sequence of subframes used to transmit PRS for OTDOA is characterized and defined by a number of parameters comprising: (i) a reserved block of bandwidth (BW); (ii) a configuration index $I_{PRS}$ (which defines both an offset $\Delta_{PRS}$ from the start of subframe zero for SFN zero to the first PRS positioning occasion and a periodicity $T_{PRS}$ in units of subframes for consecutive PRS positioning occasions); (iii) a duration $N_{PRS}$ (defining the number of consecutive PRS subframes in each PRS positioning occasion); (iv) an optional muting pattern (defining a sequence of consecutive PRS positioning occasions within which the PRS signal is either transmitted or is muted according to the muting pattern); and (v) a muting sequence periodicity $T_{REP}$ which can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the bandwidth (BW) value can be increased to the LTE system bandwidth (i.e., BW=LTE system bandwidth). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used by modifying the existing definition of OTDOA, for example, in 3GPP TS 36.355.

For the case of LTE using Time Division Duplex (TDD) mode, system frames are again each of duration 10 ms and each system frame comprises eight available subframes for uplink or downlink transmission. The PRS parameters described above for FDD are then used to define in which downlink subframes PRS transmission occurs. Specifically, the offset $\Delta_{PRS}$ provides the number of downlink subframes from the first downlink subframe in system frame zero to the first PRS subframe; the duration $N_{PRS}$ provides the number of consecutive downlink PRS subframes in each PRS positioning occasion; and the periodicity $T_{PRS}$ provides the number of downlink subframes between the start of consecutive PRS positioning occasions. Similar to FDD mode, an expanded PRS could be defined up to full duty cycle.

FIGS. 5-8 provide some examples concerning use of coherent and non-coherent integration to measure RSTD values at a UE 100. The examples show how useful periods of coherent and non-coherent integration can be related to known error characteristics for the measured cell transceivers and/or to movement of the UE 100. The examples are not intended to be limiting and may be replaced with other similar examples—e.g. that consider the effects of using coherent or non-coherent integration to overcome interference conditions, signal fading and fluctuating (as opposed to constant) frequency errors.

A UE 100 is assumed to perform coherent integration of a PRS signal received from some cell transceiver such as any cell n 310-*n* in FIG. 3 (where $1\le n\le W$) or cell R 312. In this example, the PRS signal is assumed to have a constant amplitude A and a carrier (or center) frequency f and the UE 100 is assumed to use a frequency source with a fixed fractional error e relative to f for performing the coherent integration. For example, the frequency source may be obtained from a frequency lock loop of the UE 100 to the reference cell R 312 in FIG. 3. The PRS signal may thus be sampled by the UE at intervals of approximately 1/f to obtain I and Q integration samples. Assuming that N signal samples $S_n$ are obtained by the UE 100 starting with a sample $S_0$ with an initial phase offset α, where $S_n = I_n + j\, Q_n$ ($0 \le n \le N-1$) while expressed as a complex number. The combined signal $S_N^*$ obtained by coherently integrating the N samples and the corresponding gain $G_N$ in amplitude, are given by the following equations that are known in the art (with all angles being in units of radians and where j is the imaginary number $\sqrt{-1}$).

$$S_N^* = \sum_{n=0}^{N-1} S_n \qquad (2A)$$

$$= \sum_{n=0}^{N-1} I_n + jQ_n$$

$$= \sum_{n=0}^{N-1} A \exp[(2\pi n(1+e)\alpha)j] \qquad (3)$$

$$= \sum_{n=0}^{N-1} A \exp[(2\pi n e + \alpha)j]$$

$$G_N = |S_N^*|/A \qquad (4)$$

$$= \left| \sum_{n=0}^{N-1} \exp[(2\pi n e + \alpha)j] \right|$$

$$= \left| \sum_{n=0}^{N-1} \exp[2\pi n e j] \right|$$

To summarize, in a particular embodiment, a sequence of signal sample values $S_n$ may be "coherently integrated" by obtaining a sum of components of $S_n$, and then determining a gain for the coherently integrated sum from a magnitude of the sum. For example, in coherent integration as set forth in equations (2A) and (3), in-phase components of N samples $I_n$ are combined separately from quadrature phase samples $Q_n$. A magnitude of the combination of summed $I_n$ components and summed $Q_n$ components is then determined. In "non-coherent integration," on the other hand, amplitudes of samples of $S_n$ may be summed according to equation (5) as follows:

$$S_N = \sum_{n=0}^{N-1} |S_n| \qquad (5)$$

It should understood, however, that equations (2A), (3) and (5) are merely examples of how a signal may be coherently or non-coherently integrated, and that claimed subject matter is not limited in this respect.

Figure 5:
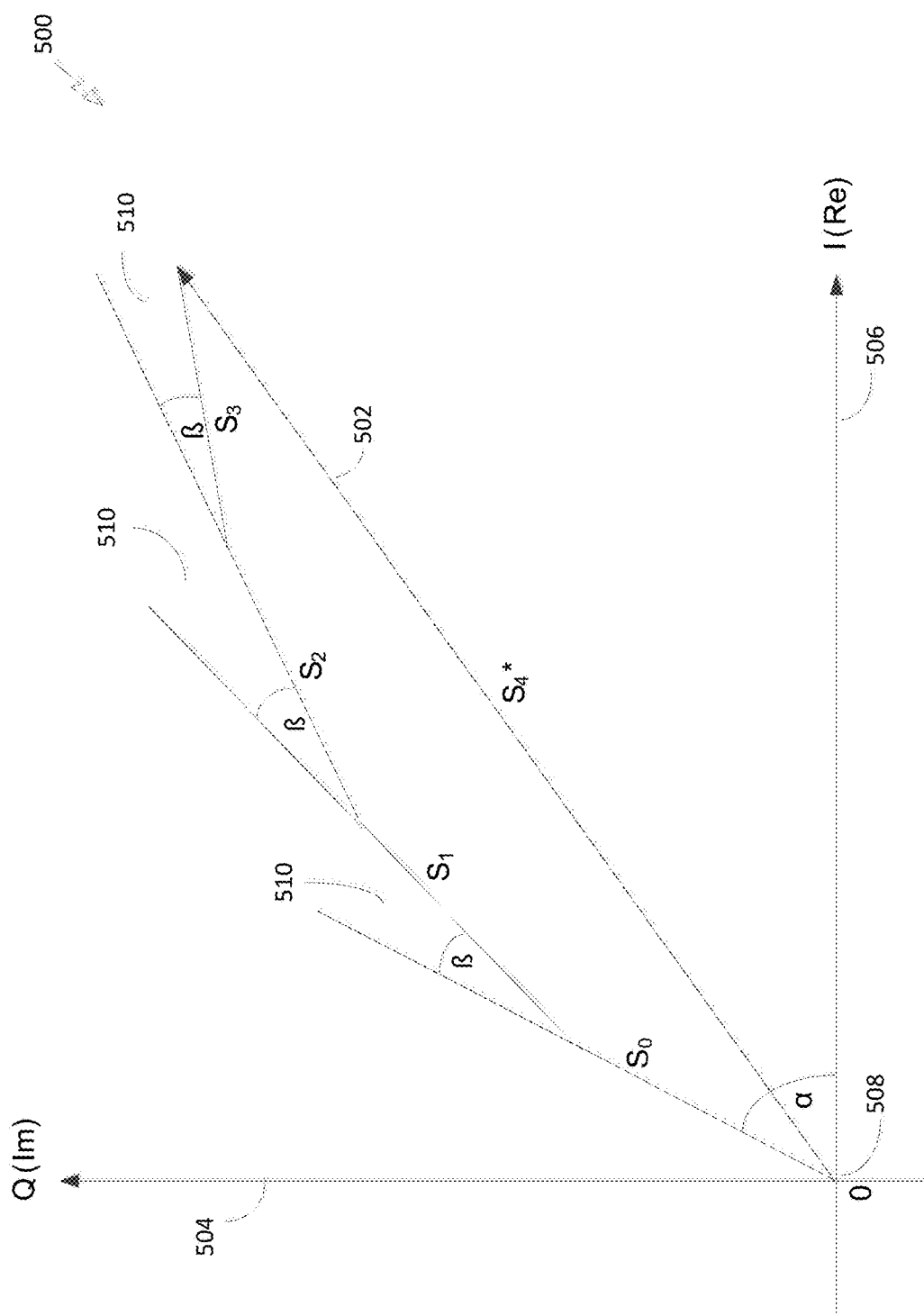
FIG. 5 shows an example of a coherently integrated signal for OTDOA positioning.

FIG. 5 provides an illustration 500 for the case where N=4 of the combined signal $S_4^*$ 502 in the complex (I/Q) plane obtained from the summation of 4 signal samples ($S_0$, $S_1$, $S_2$ and $S_3$) using coherent integration. The complex I/O plane shown in FIG. 5 includes the origin 508, the real axis 506 (for in-phase signal sample components) and the imaginary axis 504 (for the quadrature phase signal sample components). The gain $G_4$ for the combined signal $S_4^*$ 502 will equal the length of $S_4^*$ 502 in the complex plane divided by the signal amplitude A. Successive signal samples (each of length A) in FIG. 5 will rotate through a sequence of constant angles β 510 given by β=2 π e (shown in FIG. 5 for negative e). For N=2|1/2e|, the gain $G_N$ will be zero or almost zero because for each sample $S_n$ with n<N/2, there be another sample $S_{n+N/2}$ with equal but opposite in-phase (I) and quadrature phase (Q) components.

Figure 6:
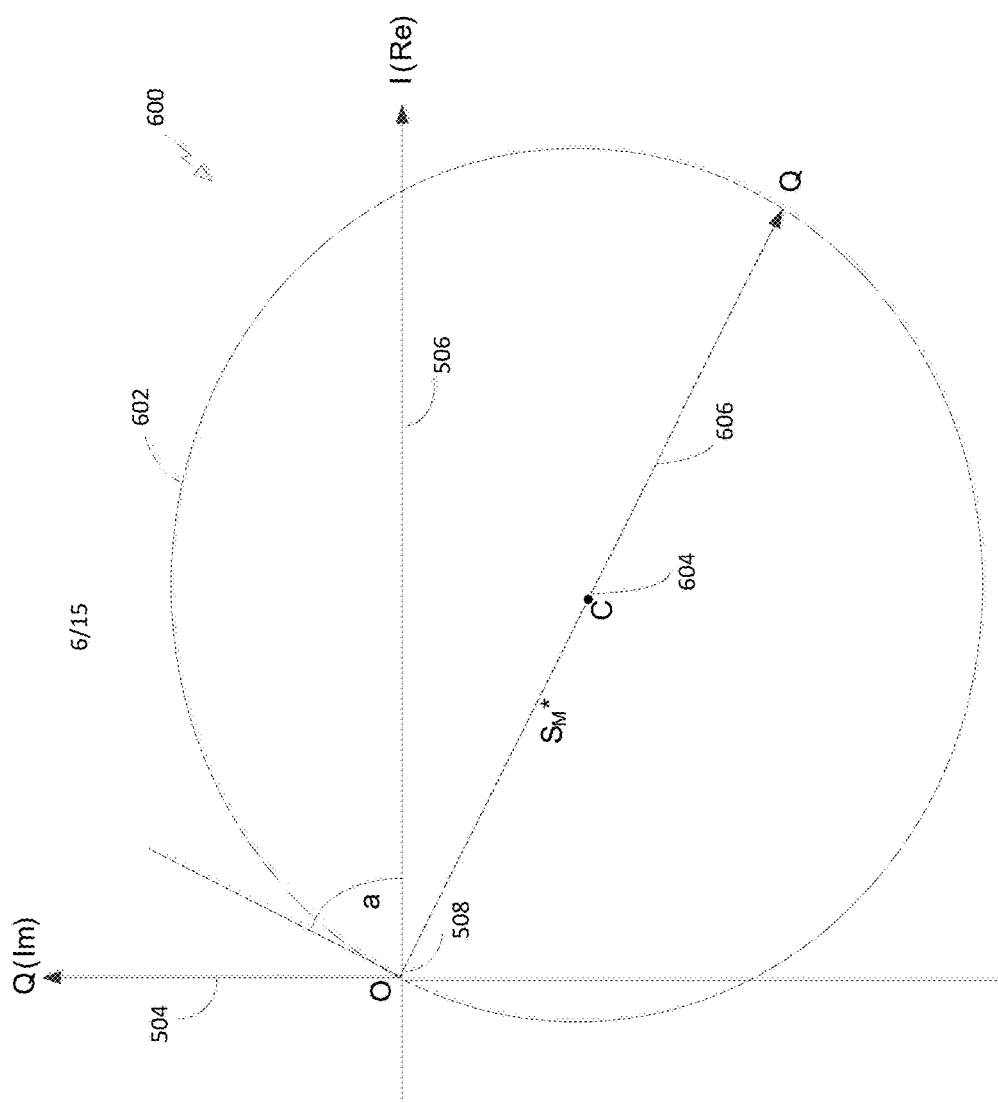
FIG. 6 shows an example of a maximum signal gain using coherent integration for OTDOA positioning.

FIG. 6 provides an illustration 600 of successive signal samples $S_n$ for n starting from zero and increasing up to 2|1/2e| that will form a regular polygon in the complex I/Q plane that can be approximated for small e by the circle 602 shown in FIG. 6. The maximum signal gain Gmax in FIG. 6 occurs for an optimum combined signal $S_M^*$ where M=|1/2e|. The optimum combined signal $S_M^*$ can be represented as a diameter 606 of the circle 602 in FIG. 6 passing through the center C 604 and with end points O and Q where O is the origin 508 of the coordinate system. M may represent an optimum value for N in the absence of noise. With noise present, a value of N lower than M may be needed to optimize S/N for the combined signal $S_N^*$, since for N less than but close to M, $G_N$ may increase more slowly with N than will the accumulated noise. Using the geometry shown in FIG. 6 with the set of signal samples $S_n$ that are being integrated approximated by the circle 602 in FIG. 6, the maximum signal gain Gmax is given by the following equations.

$$\text{Gmax} \sim ((MA)/(\pi/2))/A \qquad (6)$$

$$= 2M/\pi$$

$$\sim 1/(e\pi)$$

To determine optimum N in the presence of noise, a background white noise is assumed with amplitude variance σ. The signal to noise (S/N) ratio $R_N$ following coherent integration of N signal samples ($S_0$, $S_1$, $S_2$, up to $S_{N-1}$) is given by the following equations making use of known results for coherent integration of a signal combined with white noise.

$$R_N = A^2 G_N^2 / N \sigma^2 \qquad (7)$$

$$= (A^2/\sigma^2)(G_N^2/N)$$

Figure 7:
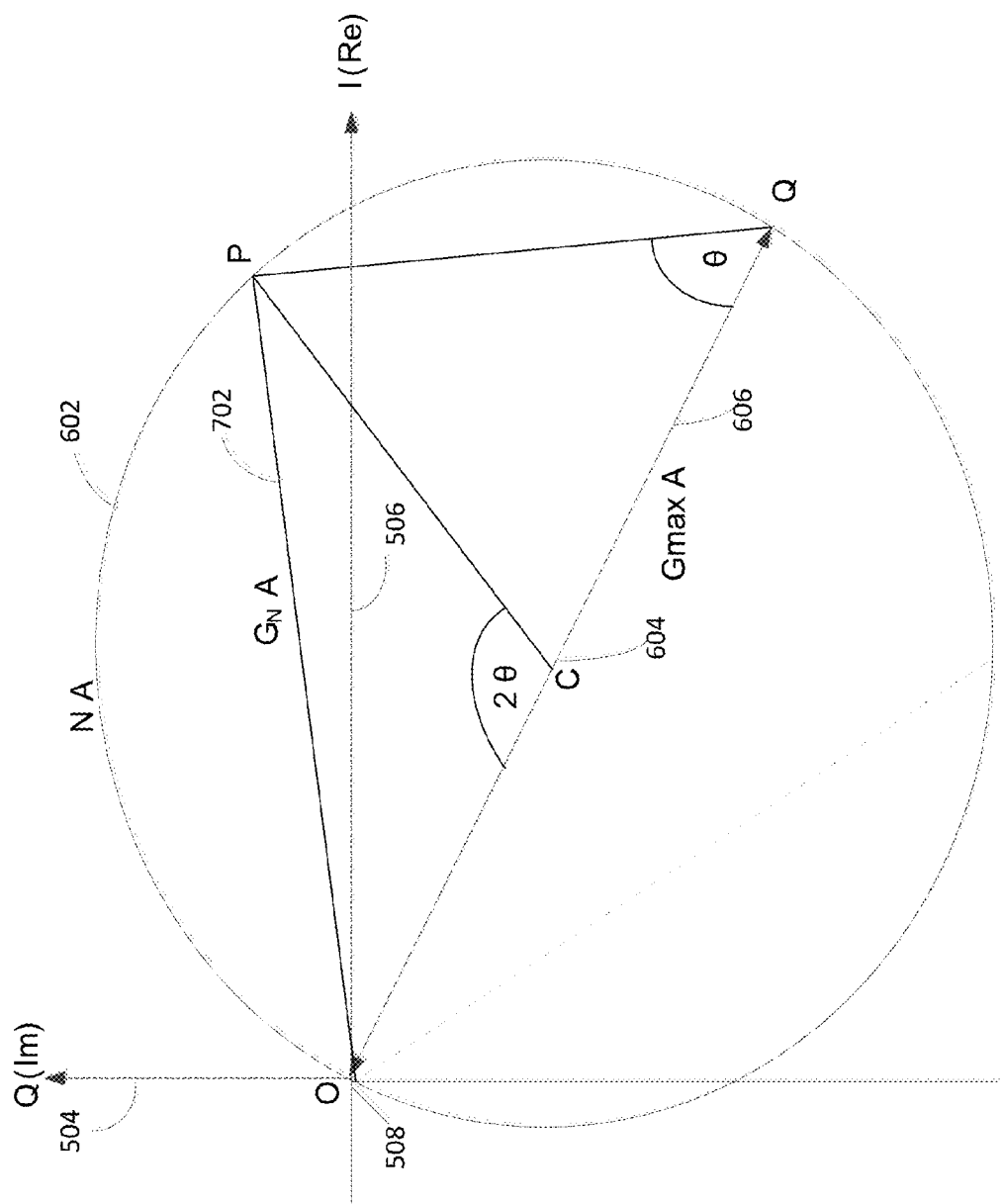
FIG. 7 shows an example of optimizing signal to noise ratio for OTDOA positioning.

FIG. 7 exemplifies how equation (7) can be solved geometrically and shows the optimum combined signal $S_M^*$ in the absence of noise along the diameter OQ 606 from FIG. 6 and another combined signal $S_N^*$ along the chord OP 702. FIG. 7 shows the amplitudes of the combined signals $S_M^*$ and $S_N^*$ which correspond to the lengths (Gmax A) and ($G_N$ A), of the lines OQ 606 and OP 702, respectively, shown in FIG. 7. FIG. 7 also shows the length of the arc OP for the circle 602 which is approximately given by the sum (N A) of the amplitudes of the N signal samples ($S_0$, $S_1$, $S_2$, up to $S_{N-1}$) that are coherently integrated. The following equations may be then inferred from the geometry shown in FIG. 7 which includes an angle 2θ subtended by the chord OP 702 at the center C 604 and an angle θ subtended at the point Q.

$$G_N A = \text{Gmax} A \sin\theta \qquad (8)$$

$$NA = (\text{Gmax} A/2) 2\theta \qquad (9)$$

Combining equations (8) and (9) gives:

$$(G_N^2/N) = (G\max\sin\theta)^2/((G\max/2)(2\theta)) \qquad (10)$$
$$= G\max[\sin^2\theta/\theta]$$

The expression on the right hand side in equation (10) equals zero for $\theta=0$ and for $\theta=\pi$ and is positive for $0<\theta<\pi$. Therefore any value $\theta^*$ of $\theta$ between 0 and $\pi$ for which the differential of this expression with respect to $\theta$ is zero will maximize the expression (if there is only one such $\theta^*$). $\theta^*$ can be obtained using the following equations.

$$d/d\theta[\sin^2\theta/\theta] = (2\theta\sin\theta\cos\theta - \sin^2\theta)/\theta^2 \qquad (11)$$
$$= 0 \text{ for } \theta = \theta^* \text{ given by:}$$
$$\tan\theta^* = 2\theta^*$$

Equation (11) can be solved to give $\theta^*$ as:

$\theta^* \sim 66.8$ degrees

Since $\theta^*$ maximizes $(G_N^2/N)$, it will also maximize, the S/N ratio $R_N$ in equation (7). The value $M^*$ of N corresponding to $\theta^*$ is given by:

$$M^* = (G\max/2)2\theta^* \qquad (12)$$
$$\sim \theta^*/(e\pi)$$

Figure 8:
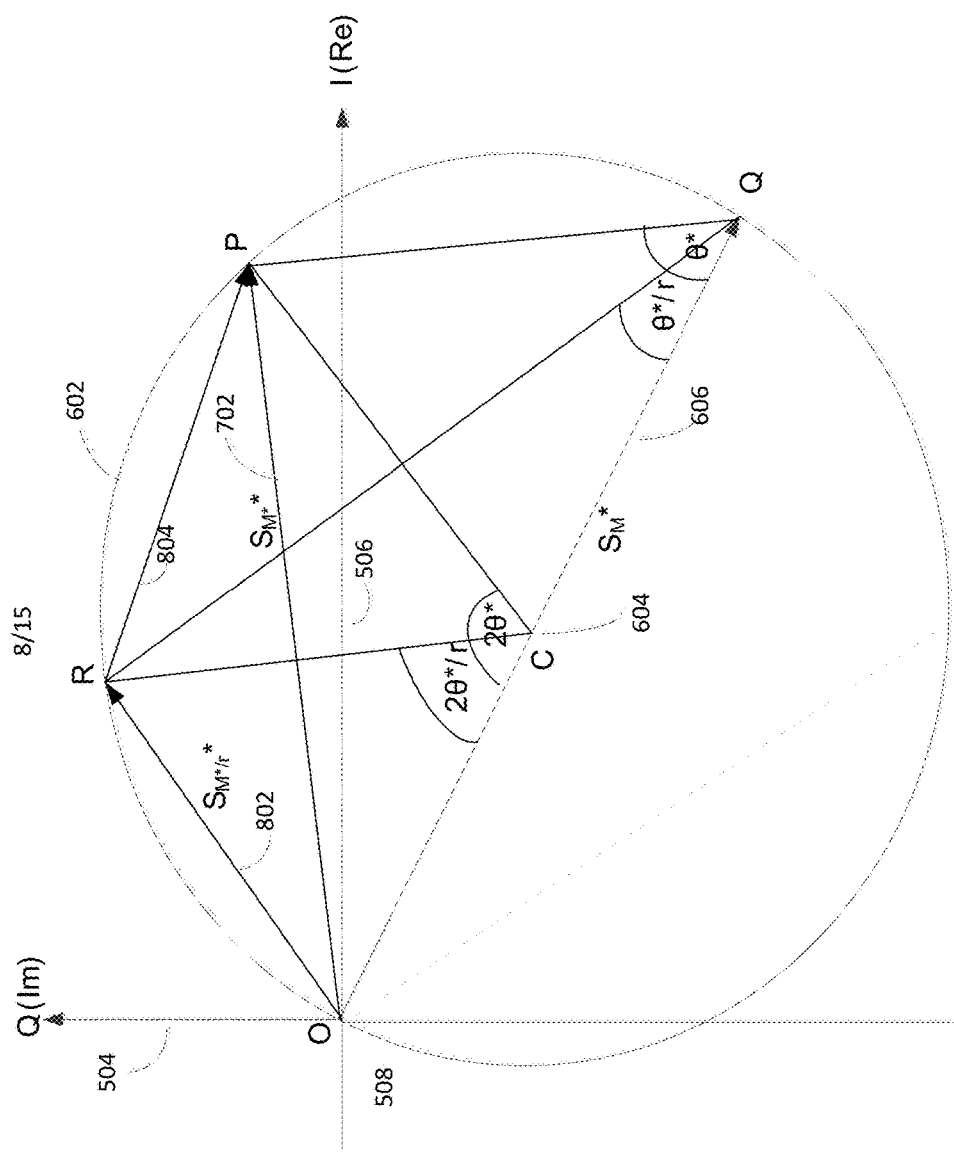
FIG. 8 shows an example of non-coherent signal integration for OTDOA positioning according to an embodiment.

In a particular implementation, FIG. 8 illustrates a combined signal $S_{M^*}*$ with maximum S/N gain, as derived previously in association with FIG. 7, which corresponds to the line OP 702 in the complex plane in FIG. 8. FIG. 8 also shows a combined signal $S_{M^*/r}*$ corresponding to the line OR 802 in the complex plane in FIG. 8. The combined signal $S_{M^*/r}*$ is obtained by coherently integrating $M^*/r$ consecutive signal samples ($S_0, S_1, S_2$, up to $S_{(M^*/r)-1}$), where r is an integer with $r \geq 2$ and assuming r is a factor of $M^*$. As an alternative to coherently integrating $M^*$ consecutive signal samples ($S_0, S_1, S_2$, up to $S_{M^*-1}$) to obtain $S_{M^*}*$, r consecutive sequences, each of $M^*/r$ consecutive signal samples, could each be separately combined using coherent integration, with the r separate combined results then being combined using non-coherent integration. As an example, in the case of r=2 and assuming $M^*$ is even, a coherent integration of the first sequence of $M^*/2$ consecutive signal samples excluding noise ($S_0, S_1, S_2$, up to $S_{(M^*/2)-1}$) corresponds to the line OR 802 in FIG. 8 and the combination of the second sequence of $M^*/2$ consecutive signal samples ($S_{M^*/2}$, $S_{(M^*/2)+1}$, up to $S_{M^*-1}$) corresponds to the line RP 804 in FIG. 8. These two integration results (together with noise components) may then be combined using non-coherent integration. The S/N ratio for a resulting non-coherent integration result, denoted $R_{M^*}(r)$, can be compared to the S/N ratio $R_{M^*}$ for the fully coherently integrated signal $S_{M^*}*$ to determine whether S/N is improved or not. From equations (7) and (10) obtained previously and the geometry shown in FIG. 8, the following equations may be derived.

$$R_{M^*} = (A^2/\sigma^2)(G_{M^*}^2/M^*) \qquad (13)$$
$$= (A^2/\sigma^2)G\max(\sin^2\theta^*/\theta^*)$$

-continued
$$R_{M^*/r} = (A^2/\sigma^2)(G_{M^*/r}^2/(M^*/r)) \qquad (14)$$
$$= (A^2/\sigma^2)G\max(r\sin^2(\theta^*/r)/\theta^*)$$

For non-coherent integration of r equivalent samples, S/N gain is known in the art to increase by a factor that is normally bounded by $\sqrt{r}$ (minimum) and r (maximum). Normally, the increase is less than r, since r represents the gain for coherent integration. This leads to the inequality (15) shown below for the improvement $I(r)=(R_{M^*}(r)/R_{M^*})$ in S/N gain obtained by combining $M^*$ signal samples using a mixture of coherent integration (over r consecutive sequences of $M^*/r$ consecutive signal samples each) and non-coherent integration compared to using coherent integration over all $M^*$ signal samples.

$$\sqrt{r} R_{M^*/r}/R_{M^*} \leq I(r) = R_{M^*}(r)/R_{M^*} \leq r R_{M^*/r}/R_{M^*} \qquad (15)$$

The lower bounds and upper bounds in the inequality (15) can be expressed as shown in the following equations.

$$\text{Lower Bound } I(r) = \sqrt{r R_{M^*/r}/R_{M^*}} \qquad (16)$$
$$= (r\sin(\theta^*/r)/\sin\theta^*)^2/\sqrt{r}$$

$$\text{Upper Bound } I(r) = r R_{M^*/r}/R_{M^*} \qquad (17)$$
$$= (r\sin(\theta^*/r)/\sin\theta^*)^2$$
$$\sim (\theta^*/\sin\theta^*)^2 (r \text{ large}) \qquad (18)$$

A maximum for the lower bound shown in equation (16) for $r \geq 1$ may be obtained from the value $r^*$ of r that gives a zero differential of the lower bound with respect to r when r is allowed to be a non-integer (which is algebraically sound though not feasible for integration purposes). The value of $r^*$ is obtained using the following equations.

$$d/dr[(r\sin(\theta^*/r)/\sin\theta^*)^2/\sqrt{r}] =$$
$$3/2\sqrt{r}(\sin(\theta^*/r)/\sin\theta^*)^2 - 2\theta^*\sin(\theta^*/r)\cos(\theta^*/r)/(\sin^2\theta^*\sqrt{r}) =$$
$$0 \text{ for } r = r^*$$

where $$3r^*\tan(\theta^*/r^*) = 4\theta^*$$

giving $r^* \sim 1.38$

Table 1 shows lower and upper bounds for different values of r, as obtained from equations (16), (17) and (18), and including r=1 where both the lower and upper bounds equal 1.0.

TABLE 1

| r | Lower Bound I(r) | Upper Bound I(r) |
|---|---|---|
| 1 | 1.000 | 1.000 |
| 1.38 | 1.073 | 1.261 |
|  | (maximum) |  |
| 2 | 1.015 | 1.435 |
| 3 | 0.883 | 1.530 |
| 4 | 0.782 | 1.564 |
| 5 | 0.707 | 1.580 |
| $r \to \infty$ | 0 | 1.609 |

Since the upper bound for V) in Table 1 cannot exceed 1.609 for large r whereas the lower bound tends to zero for large r, an optimum value of r could be considered as r* (1.38) or 2, both of which will provide a higher S/N than r=1. Since r=2 provides a higher upper bound and only a slightly smaller lower bound, r=2 provides a possible optimum value for r in one implementation though other values of r such as 1.38 are also possible. This means that a useful maximum (or optimum) number of consecutive signal samples for performing coherent integration may be M*/2 (or M*/r for another value of r such as r=1.38). For more signal samples than M*/2 (or M*/r for another value of r such as r=1.38), coherent integration results (for M*/2 signal samples or M*/r signal samples) may be combined non-coherently. The consequences to frequency errors and UE velocity are illustrated next. Equation (12) derived earlier shows the following.

$$M^* \sim \theta^* /(e\pi)$$

Giving:

$$M^*/2 \sim \theta^*/(2e\pi) \quad (19)$$
$$= 0.186/e$$

For a PRS with carrier frequency f that is coherently integrated using a frequency source with error e (as previously described) over m LTE subframes (each of duration 1 ms), where the m subframes comprise (M*/2) consecutive signal samples in total, m and e are related by the follow equation which can be derived from equation (19).

$$mf/1000 = 0.186/e$$

Giving:

$$m = 186/(ef) \quad (20)$$

$$e = 186/(mf) \quad (21)$$

Equation (20) shows how a maximum (or optimum) number of LTE subframes m for coherent integration can be obtained from a given frequency f and given frequency error e. Equation (21) shows how a maximum frequency error e allowing useful coherent integration over m consecutive LTE subframes for a given frequency f can be obtained from m. Table 2 shows some example values of e, in ppm, obtained using equation (21) for two alternatives frequencies f and different numbers of subframes m.

TABLE 2

| Subframes m | Freq error e with f = 700 MHz | Freq error e with f = 2100 MHz |
|---|---|---|
| 1 | 0.27 | 0.089 |
| 2 | 0.13 | 0.044 |
| 5 | 0.053 | 0.018 |
| 10 | 0.027 | 0.0089 |
| 20 | 0.013 | 0.0044 |
| 50 | 0.0053 | 0.0018 |
| 100 | 0.0027 | 0.00089 |

The values of e shown in Table 2 would be the maximum error values to allow useful coherent integration over the number of LTE subframes m since for any higher value of e, there would be more signal samples to combine than M*/2. For example, in the case of m=10, Table 2 shows that the maximum frequency error e would be 0.027 ppm for a carrier frequency f of 700 MHz and 0.0089 ppm for a carrier frequency f of 2100 MHz. Typically, the number of LTE subframes m may equal the number of subframes $N_{PRS}$ (as described for FIG. 4) in each PRS positioning occasion for a particular cell. For a frequency error e only slightly higher than that given in Table 2 for any value of m, coherent integration could still be employed over the m LTE subframes without much reduction of the resulting S/N. If a UE 100 uses a reference cell as a frequency source for integrating consecutive signal samples from a neighbor cell, then, in a worst case (where both cells have the same frequency), the frequency e may represent the sum of the frequency errors for both cells and the values of e shown in Table 2 may then be divided by two when both cells have equal error to show the maximum frequency error for each cell. However, if the reference cell frequency error is much less than for the neighbor cell or if a UE 100 uses some other accurate frequency source (e.g. such as GPS or some other GNSS) to coherently integrate a PRS signal from a neighbor cell, then the values of e shown in Table 2 may represent maximum frequency errors in just the neighbor cell.

The information in Table 2 or similar information configured in a UE 100 or derived by a UE (e.g., using an equation similar to or the same as equation (21)) may be used by a UE 100 to determine an optimum period (e.g. an optimum number of subframes) for coherent integration of a PRS signal from a reference cell or a neighbor cell if information associated with the frequency error e for the neighbor cell and/or for the reference cell is available to the UE 100—e.g. provided to the UE 100 by a location server such as E-SMLC 208, SLP 232 or location server 302. As described previously, the information associated with the frequency error e for a neighbor cell and/or for a reference cell could comprise a numeric value for the error e (e.g., such as numeric values for e shown in Table 2), an error class for the error e (e.g., such as an error class defining a range of values for the error e or a maximum or minimum value for the error e), or an indication that a neighbor cell is or is not suitable to be used as a reference cell (e.g. which may be equated with some configured maximum value or minimum value, respectively, for the error e).

Frequency error minimum requirements for different types of eNB, as defined in 3GPP TS 36.104, are shown in Table 3 which shows the maximum frequency errors allowed for different types of eNode base station (BS). It may be clear from a comparison of Tables 2 and 3 that all types of eNB defined by 3GPP may be potentially unsuitable for use as a frequency source by a UE when PRS positioning occasions comprise multiple subframes (e.g., m 5), since the maximum frequency errors in Table 3 typically exceed those shown in Table 2. It may also be clear from Tables 2 and 3 that long periods of coherent integration (e.g., for m≥10) for a PRS signal may only be possible with accurate eNBs supporting both neighbor and reference cells (e.g., not a small cell which may correspond to a home BS in Table 3). The fact that 3GPP maximum frequency errors may only allow short periods of optimum coherent PRS integration (e.g., of up to m=2 subframes for a wide area BS with a 2100 MHz carrier frequency) may mean that knowing the exact or approximate actual frequency error e for any eNodeB can be of value in acquiring and measuring PRS signals from different cells. As shown above, if a PRS signal needs to be integrated over a period longer than the optimum period for coherent PRS integration, then a UE 100 could perform coherent integration of the PRS signal over separate consecutive periods, each corresponding to the optimum period except for the last period which could be shorter, and could then combine the separate coherent integration results (for each of the separate consecutive periods) using non-coherent integration. As shown above, this will normally achieve a maximum or near maximum for the resulting S/N and may thus result in a more accurate or most accurate measurement of TOA or RSTD.

TABLE 3

| BS class | Accuracy (e) |
| --- | --- |
| Wide Area BS | ±0.05 ppm |
| Medium Range BS | ±0.1 ppm |
| Local Area BS | ±0.1 ppm |
| Home BS | ±0.25 ppm |

In the case of a UE 100 moving with a velocity v, the frequency f of any cell may be seen by the UE 100 to apparently increase by an amount (v f cos δ/c) due to Doppler effects, where c is the signal speed (e.g., speed of light) and δ is the angle between the direction of the velocity v and the direction of the cell antenna as seen from the UE 100. The apparent frequency error e due to v is thus (v cos δ/c) for which the unsigned maximum is (v/c) and the unsigned mean is (2 v/c π) when all directions are horizontal. When a reference cell (e.g., the cell R 312) is used as a frequency source for a neighbor cell (e.g., any cell n 310-n), the apparent frequency error of the latter, due to the velocity v, will equal the difference between the two apparent frequency errors for the two cells which may have a root mean square value of (v/c) and a maximum unsigned value of (2 v/c) when a UE 100 is moving towards one cell and away from the other on a line joining the two cells. Substituting (2 v/c) for e in equation (21) derived for e above gives the following equation.

$$v=186c/(2mf) \quad (22)$$

Table 4 shows some example values of v as obtained, using equation (22) and in meters/second, for two alternatives frequencies f and different numbers of LTE subframes m.

TABLE 4

| Subframes m | Max velocity v with f = 700 MHz | Max velocity v with f = 2100 MHz |
| --- | --- | --- |
| 1 | 40 | 13 |
| 2 | 20 | 6.6 |
| 5 | 8.0 | 2.7 |
| 10 | 4.0 | 1.3 |
| 20 | 2.0 | 0.66 |
| 50 | 0.80 | 0.27 |
| 100 | 0.40 | 0.13 |

Similarly to Table 2, the values of v shown in Table 4 may represent maximums, in a worst case, for which coherent integration over m PRS subframes may maximize S/N. For example, Table 4 shows that a maximum velocity v (in a worst case) allowing coherent PRS integration over m=5 subframes may be 8.0 meters per second for a frequency f of 700 MHz and 2.7 meters per second for a frequency f of 2100 MHz. Table 4 shows that use of coherent integration may be very sensitive to UE motion. Even performing coherent integration over one LTE subframe may not be effective for a UE in a fast moving car, and for long periods of coherent integration (e.g., m 10) may require that a user of a UE 100 be stationary or at most walking.

A UE 100 could determine its velocity v using sensors for the UE 100 (e.g., sensors 135 in FIG. 1) and/or by measuring differences in apparent frequency for two or more cells (e.g., a cell n 310-n and cell R 312 in FIG. 3) if the frequencies of the two or more cells are known to be accurate (e.g., from frequency error related information of the type described elsewhere here that may be provided to a UE 100 by a location server). The root mean square of the apparent difference in frequency between two cells of the same frequency f caused by a velocity v for the UE 100 may be (v f/c) when the two cells, the UE 100 and the direction of the UE 100 velocity v are all in the same horizontal plane (which may typically and approximately be the case in most environments). Hence if a UE 100 measures the apparent frequency differences between two or more pairs of cells with known accurate frequency f and obtains the square root S of the mean of the squares of these differences (which may approximate (v f/c)), the velocity v may be estimated as (S c/f).

To obtain a UE velocity v more accurately from an apparent difference in frequency between pairs cells with a common accurate frequency f, a UE 100 could measure the angle of signal arrival (AOA) from each cell (e.g. using multiple antenna elements 122 or an antenna array 122) which may provide a direction from the UE 100 to each measured cell antenna. The following equations show how the velocity v can be obtained for the example shown in FIG. 3 where a UE 100 measures the apparent frequency differences and AOAs for some of the cells n 310-n in FIG. 3. The equations assume that all directions lie in the same horizontal plane. The reference direction for measuring any AOA by the UE 100 may be arbitrary (e.g., a reference direction defined by a current orientation of the UE 100 or an absolute direction such true North or magnetic North). Any other direction (e.g. as measured for an AOA) may then be defined using the clockwise (or anticlockwise) angle between the reference direction and the other direction.

Let γ=direction of velocity v

Let $\epsilon_p$=direction of any cell antenna Ap as seen from UE 100

Let $\Delta f_p$=apparent frequency increase of any cell p seen by UE 100

Then:

$$\Delta f_p = vf \cos(\gamma - \epsilon_p)/c$$

Giving for 2 different cells p and q:

$$\Delta f_p - \Delta f_q = (vf \cos(\gamma - \epsilon_p)/c) - (vf \cos(\gamma - \epsilon_q)/c) \quad (23)$$

The left hand side of equation (23) is the apparent difference in the frequency f of two cells p and q and may be measured by UE 100. Similarly, the two directions $\epsilon_p$ and $\epsilon_q$ of the antennas for cells p and q, respectively, can be measured by UE 100 using an AOA method. That leaves only the magnitude v and direction γ of the UE 100 velocity as unknowns in equation (23), implying that both can be determined if the UE 100 measures the AOA for three different cells and the apparent frequency difference between any two pairs of them and provided that the AOAs (i.e. the directions $\epsilon_p$ and $\epsilon_q$) are different for all three cells. The derivation associated with equation (23) can be extended to cells that have different frequencies—e.g. if a UE 100 converts the frequency of each cell into some common frequency through multiplication by a known conversion factor.

A UE 100 can use the velocity v (e.g., derived as described above) to determine an optimum period for coherent PRS integration for one or more cells. In the case that a frequency error e occurs due to (i) a velocity v of a UE 100, (ii) a frequency error in a cell (e.g., a serving cell or reference cell) used as a frequency source to measure neighbor cells and/or (iii) a frequency error in a neighbor cell, a UE 100 may first obtain the separate frequency errors for (i), (ii) and/or (iii) as described previously and may then combine the frequency errors (e.g., by summation). The UE 100 may then use the combined frequency error to determine an optimum period (e.g. an optimum number of consecutive LTE subframes m) for coherent integration of a PRS signal from the neighbor cell using information similar to or the same as that in Table 2 and/or using a relationship similar to or the same as that in equation (20).

Items and/or techniques described herein may provide one or more of the following capabilities, as well as other capabilities not mentioned. Positioning assistance data including an indication of a plurality of cell transceivers with associated frequency error characteristics for one or more of the cell transceivers may be provided from a location server to a UE. The UE may determine RSTD measurements based on the positioning assistance data. In this context, "positioning assistance data" comprises one or more values, parameters, indications, inferences, etc., that may be applied by a mobile device (e.g. a UE 100) in obtaining an estimated location of the mobile device, or in obtaining one or more measurements that are indicative of a location of the mobile device. In one implementation, positioning assistance data may be provided to a mobile device (e.g. a UE 100) in one or more messages from a location server. However, this is merely an example of how a mobile device may obtain positioning assistance data and claimed subject matter is not limited in this respect. In a particular implementation, positioning assistance data may comprise an expected carrier frequency of a downlink signal. This may, for example, allow a mobile device to accurately determine a rate for sampling a downlink signal to perform a positioning operation. According to an embodiment, positioning assistance data may also comprise a "frequency error characteristic" which may comprise one or more values, parameters, inferences, etc., which are indicative of a difference between an actual carrier frequency of a downlink signal and an expected or defined carrier frequency of the downlink signal. As pointed out above, a frequency error characteristic of a cell transceiver may comprise (i) a carrier frequency error value for the cell transceiver, (ii) a carrier frequency error class for the cell transceiver or (iii) an indication that the cell transceiver is suitable or unsuitable to be used as a reference cell. It should be understood, however, that these are just examples of a frequency error characteristic and that claimed subject matter is not limited in this respect.

Referring to FIG. 9A, with further reference to FIGS. 1-8, a message flow process 900 of an example procedure for supporting positioning using coherent and non-coherent integration for OTDOA with the LPP protocol is shown. The entities in the message flow process 900 include a UE 902 and a location server 904. The UE 902 may correspond to the UE 100 in FIGS. 1-3 and the location server 904 may correspond to the E-SMLC 208 or SLP 232 in FIG. 2 and/or to the location server 302 in FIG. 3. Positioning of the UE 902 as exemplified in FIG. 9A is supported via an exchange of LPP messages between the UE 902 and the location server 904. The LPP messages may be exchanged between UE 902 and location server 904 via one or more intermediate networks such as network 250 or network 306 and/or via a base station or AP such as any of cell transceivers 310-1 to 310-W and 312 R in wireless communication system 300 or eNB 202 in network 250. The LPP messages and the procedures that they support are described in 3GPP TS 36.355. The procedure shown in FIG. 9A may be used to position the UE 902 in order to support some location related service like navigation or direction finding support for UE 902 (or for the user of UE 902) or for routing or provision of an accurate location to a PSAP in association with an emergency call from UE 902 to a PSAP (e.g. as described in association with FIG. 2), or for some other reason.

Initially and as an optional stage in process 900, UE 902 may provide its positioning capabilities to location server 904 relative to the LPP protocol by sending an LPP Provide Capabilities message at stage 906 to location server 904 indicating the position methods and features of these position methods that are supported by UE 902 using LPP. In one implementation, the LPP Provide Capabilities message at stage 906 may be sent by UE 902 in response to an LPP Request Capabilities message sent by location server 904 to UE 902 (not shown in FIG. 9A). The capabilities indicated in the LPP Provide Capabilities message at stage 906 may in some embodiments indicate that UE 902 supports OTDOA positioning and/or may indicate that the UE 902 supports receipt of assistance data related to the carrier frequency accuracy of cell transceivers. Location server 904 may then determine to position the UE 902 using OTDOA for LTE access—e.g. because the UE 902 capabilities sent at stage 906 indicate support of OTDOA by UE 902 and/or because UE 902 may currently have LTE wireless access to a serving network containing location server 904.

Location server 904 may then send an LPP Provide Assistance Data message to UE 902 at stage 908. In some implementations, the LPP Provide Assistance Data message at stage 908 may be sent by location server 904 to UE 902 in response to an LPP Request Assistance Data message sent by UE 902 to location server 904 (not shown in FIG. 9A). In some implementations, the LPP Provide Assistance Data message at stage 908 may be sent after the message at stage 910. The LPP Provide Assistance Data message at stage 908 may include positioning assistance data in the form of OTDOA assistance data to enable or help enable UE 902 to obtain and return OTDOA RSTD measurements and may include information for a reference cell (e.g. cell R 312) that may include a global ID for the reference cell, a physical cell ID for the reference cell, carrier frequency information, PRS signal information (e.g., bandwidth, frequency, number of subframes per PRS positioning occasion, starting point and periodicity of PRS positioning occasions, muting sequence). The LPP Provide Assistance Data message at stage 908 may also include OTDOA assistance data for neighbor cells (e.g. one or more of cells 310-1 to 310-W). In an example, if the UE 902 indicates support for inter-frequency RSTD measurements, the neighbor cell assistance data may be provided for up to 3 frequency layers. The information provided for each neighbor cell in the LPP Provide Assistance Data message at stage 908 may be similar to that provided for the reference cell (e.g. may include a cell ID, cell frequency and PRS signal information) and may further include a slot number and/or subframe offset between the neighbor cell and the reference cell, an expected approximate RSTD value and RSTD uncertainty, just to provide a few examples.

In a particular implementation, the location server 904 may include in the LPP Provide Assistance Data message at stage 908, for example, identifiers of a plurality of cell transceivers (e.g. for the reference cell and/or each neighbor cell) and expected carrier (or center) frequencies at which respective cell transceivers are transmitting a PRS in a downlink signal. The location server 904 may further include as part of positioning assistance data in the LPP Provide Assistance Data message a frequency error characteristic for one more of the plurality of cell transceivers indicative of an error associated with one or more of the expected carrier frequencies. In one embodiment, one or more frequency error characteristics may be included in the message at stage 908 by the location server 904 if the UE capabilities provided in the message at stage 906 indicate that the UE 902 supports receipt of a frequency error characteristic. A frequency error characteristic may express an uncertainty or expected error in an expected carrier frequency of a PRS transmitted by a particular cell transceiver. The UE 902 may then determine a usage of coherent integration and/or non-coherent integration based, at least in part, on at least one of the frequency error characteristics to measure a characteristic (e.g. a TOA or RSTD) for a downlink PRS signal for at least one of the plurality of cell transceivers according to the OTDOA positioning method. In a particular implementation, a frequency error characteristic may comprise an indication of a suitability of an associated cell transceiver as a reference cell transceiver for OTDOA. In another particular implementation, a frequency error characteristic may comprise an indication of a class of the frequency error characteristic (e.g. an upper bound, lower bound or range of values for an error e described in association with FIGS. 5-8) or a maximum or expected value for a frequency error characteristic. In one implementation, the frequency error characteristic may correspond to the fractional error in a carrier frequency for an associated cell transceiver (e.g. expressed in ppm).

The location server 904 may then send an LPP Request Location Information message at stage 910 to UE 902 to request OTDOA RSTD measurements for the reference cell and neighbor cells indicated at stage 908. The LPP Request Location Information message at stage 910 may include environmental characterization data to provide the UE 902 with information about expected multipath and/or non-line of sight (LOS) in the current area. The LPP Request Location Information message at stage 910 may also include a desired accuracy (e.g., of a location estimate based on RSTD measurements provided by the UE 902) and a response time (e.g., the maximum time between receipt of the LPP Request Location Information message at stage 910 by the UE 902, and the time of the transmission of an LPP Provide Location Information message at stage 914 by the UE 902). An optional periodic reporting period may also be included in the message at stage 910.

As pointed out above, positioning assistance data received at stage 908 may indicate that a particular cell transceiver is to be used as a reference cell for OTDOA RSTD measurements by UE 902. Positioning assistance data received at stage 908 may comprise expected carrier frequencies of downlink signals for cells and associated frequency error characteristics. In addition or instead, positioning assistance data received in the LPP Provide Assistance Data message at stage 908 may provide a frequency error characteristic for any reference cell and/or for one or more neighbor cells. A frequency error characteristic provided in an LPP Provide Assistance Data message may indicate whether a particular cell may be used as a reference cell, may not be used as a reference cell or must not be used as a reference cell. The frequency error characteristic may also or instead provide an indication of an expected or maximum error in a carrier frequency for a reference cell or neighbor cell. UE 902 may then make use of any reference cell indicated at stage 908 to obtain OTDOA RSTD measurements without changing the reference cell—e.g. if the UE is able to receive strong signals from the reference cell and measure a PRS signal accurately without the need for long signal integration. In that case, UE 902 may not perform stage 911 in process 900. Alternatively, UE 902 may determine a reference cell for ODTOA positioning at stage 911—e.g. if no reference cell is provided by server 904 in the positioning assistance data received at stage 908 or if a reference cell is provided. Determination of a reference cell at stage 911 may be based, in part, on one or more frequency error characteristics provided by the location server 904 in the assistance data in the LPP Provide Assistance Data message sent at stage 908. For example, if the frequency error characteristics provided by the location server 904 indicate which neighbor cells are and/or are not suitable for use as a reference cell, UE 902 may determine a particular cell to be a reference cell that is indicated as being suitable as a reference cell (or is not indicated as being unsuitable as a reference cell). The UE 902 may further base the determination of a reference cell on the signal level and/or signal quality (e.g. S/N) of each cell that is indicated as being suitable as a reference cell (or is not indicated as being unsuitable as a reference cell). In some cases, the UE 902 may determine to use the same reference cell that was indicated by the server 904 in the LPP Provide Assistance Data message at stage 908 (e.g. because other cells indicated as being suitable or not unsuitable as reference cells have lower signal strength and/or lower S/N). In other cases, the UE 902 may determine to use a different reference cell than was indicated by the server 904 at stage 908 (e.g. because the determined different cell was indicated as being suitable or not unsuitable as a reference cell in the message at stage 908 and has higher signal strength and/or higher S/N than the reference cell indicated at stage 908).

At stage 912, UE 902 may determine a frequency source or more than one frequency source. The frequency source may be used at stage 913 as described later to perform coherent signal acquisition (or integration) by enabling UE 902 to accurately determine an expected carrier frequency of a downlink signal of any cell transceiver whose downlink PRS signal is to be acquired and measured. A frequency source may comprise the reference cell determined at stage 911, a reference cell indicated in the LPP Provide Assistance Data message at stage 908, the serving cell for UE 902, or some neighbor cell indicated in the assistance data conveyed at stage 908. A frequency source may be determined using a frequency error characteristic provided at stage 908 for the frequency source that indicates that the frequency source has a low carrier frequency error or some maximum carrier frequency error (e.g. a value or a maximum value for a carrier frequency error that is similar to or the same as the error e described in association with FIGS. 5-8 and where the error e is small enough to allow a long period or a preferred period of coherent integration as exemplified in the discussion associated with Table 2). As an example, a frequency source may be chosen as a cell with the lowest carrier frequency error or as a cell with the lowest carrier frequency error whose received signal strength (e.g. RSSI) and/or received signal quality (e.g. S/N) also exceed some minimum threshold(s). In some implementations, a frequency source may not be a serving cell, reference cell or neighbor cell but instead may be some other source such as a GNSS (e.g. GPS) space vehicle with a known and highly accurate expected carrier frequency, for which any error information may indicate close to zero error.

At stage 913, the UE 902 utilizes the OTDOA positioning assistance information received at stage 908 and any additional data (e.g. a desired accuracy of a location estimate) received at stage 910 to perform RSTD measurements for the OTDOA position method. The RSTD measurements may be made between the reference cell (e.g., the reference cell determined at 911 or the reference cell indicated at stage 908) and one or more of the neighbor cells indicated at stage 908. In obtaining the RSTD measurement between the reference cell and any neighbor cell, the UE 902 may use any frequency error characteristic provided for the reference cell and/or for the neighbor cell to determine the use (or usage) of coherent and/or non-coherent integration to measure an RSTD between the reference cell and the neighbor cell. In some implementations, the RSTD may be measured by first measuring a time of arrival (TOA) for a PRS of the reference cell and a TOA for a PRS of the neighbor cell and then determining the RSTD measurement from the difference in the two TOA measurements. In these implementations, the TOA for the neighbor cell may be measured using the determined usage of coherent and/or non-coherent integration. As shown in association with FIGS. 5-8, a UE 902 may determine a maximum period of time (or a maximum number of consecutive PRS subframes) for which coherent signal integration of a PRS signal from any measured cell may achieve high or maximum S/N. This maximum time period (or maximum number of consecutive PRS subframes) may be related to a frequency error characteristic for the measured cell, which in turn may be related to (i) an expected frequency error in a frequency source determined at stage 912 or provided at stage 908, (ii) an expected frequency error for the measured cell, and/or (iii) an estimated velocity for the UE 902. The expected frequency error for (i) and (ii) may be provided directly or indirectly by any frequency error characteristic provided by the server 904 in the positioning assistance data at stage 908 or may be already known to and configured in the UE 902 (e.g., in the case of using GNSS as a carrier frequency source). The expected frequency error for (i) and (ii) may be provided directly if any frequency error characteristic provided by the server 904 at stage 908 includes a frequency error value or error class. The frequency error information for (i) and (ii) may be provided indirectly if any frequency error characteristic provided by the server 904 at stage 908 includes a suitability or unsuitability of a cell for use as a reference cell (e.g. since such suitability may be equated to some maximum frequency error value and such unsuitability may be equated to some minimum frequency error value). The expected carrier frequency error information for (iii) may be estimated by the UE 902 if the UE 902 is able to estimate its velocity—e.g. using an inertial sensor or sensors in UE 902 and/or by other techniques such as those previously described (e.g. in association with equation (23)).

Having determined a maximum period of time for which coherent signal integration of a PRS from any neighbor cell can be used, the UE 902 may determine to either (a) perform coherent integration of the PRS signal from the neighbor cell over this time period or over a smaller time period, or (b) perform coherent integration of the PRS signal from the neighbor cell over a sequence of separate time periods that are each equal to or less than the determined maximum time period with the separate coherent integration results for the sequence of separate time periods being combined using non-coherent integration. Alternative (a) may be selected if a duration of any PRS positioning occasion for the neighbor cell is less than or equal to the determined maximum period of time, and if the coherent integration result has high enough S/N to permit an accurate measurement (e.g. of TOA or RSTD). Alternative (b) may be used when the duration of any PRS positioning occasion for the neighbor cell exceeds a determined maximum period of time and/or if a single coherent integration result over the maximum period of time does not have high enough S/N to permit an accurate measurement. However, determination of coherent and non-coherent integration based on the provided frequency error characteristics may be possible using different techniques. The UE 902 may similarly measure the PRS for the reference cell by determining a maximum period of time for which coherent signal integration of a PRS from the reference cell can be used. However, since the UE 902 may perform a frequency lock loop to the reference cell carrier frequency, any frequency errors may not affect signal acquisition and measurement. UE 902 can then obtain an RSTD measurement for the neighbor cell—e.g. from the difference between a TOA measurement for the reference cell and a TOA measurement for the neighbor cell. The process can be repeated at stage 913 for other neighbor cells—e.g. until the UE 902 has obtained RSTD measurements for all neighbor cells provided by the server 904 at stage 908 or until the UE 902 attains any maximum response time indicated in the location request at stage 910.

The UE 902 may then send an LPP Provide Location Information message at stage 914 to the location server 904 conveying RSTD measurements that were obtained at stage 913 and before or when any maximum response has expired (e.g., a maximum response time provided by the location server 904 at stage 910). The LPP Provide Location Information message at stage 914 may include the time (or times) at which the RSTD measurements were obtained and the identity of the reference cell for the RSTD measurements (e.g., the reference cell ID and carrier frequency). The message at stage 914 may also include a neighbor cell measurement list including, for each measured neighbor cell, the identity of the cell (e.g. physical cell ID, global cell ID and/or cell carrier frequency), the RSTD measurement for the cell and the quality of the RSTD measurement for the cell (e.g. the expected error in the RSTD measurement). The neighbor cell measurement list may include RSTD data for one or more cells.

Stage 916 may comprise a computation by location server 904 of an estimated location of UE 902 using ODTOA positioning techniques based, at least in part, on measurements received in the LPP Provide Location Information message at stage 914 (e.g., RSTD measurements). As an example, location server 902 can use the technique described herein in association with FIG. 3 to compute a location estimate. In an alternative embodiment, the location computation stage 916 may be performed by UE 902 following stage 913 (as described for FIG. 3)—e.g. if positioning assistance data transferred in the message at stage 908 includes BSA for the reference and neighbor cells (e.g. cell antenna location coordinates and timing or time synchronization information). In this embodiment, UE 902 may return any computed location estimate to location server 904 in the message at stage 914 and stage 916 may not be performed.

FIG. 9A shows exemplary support for OTDOA positioning using the LPP positioning protocol. However, other examples exist where the positioning protocol and/or the position method may be different. For example, in alternative embodiments, the positioning protocol may be LPPe, LPP/LPPe, the RRC protocol defined in 3GPP TS 36.331 or the IS-801 protocol defined in 3GPP2 TS C.S0022. Similarly, the position method may be OTDOA for UMTS access, Enhanced Observed Time Difference (E-OTD) for GSM or AFLT. In addition, the downlink signal that is measured may not be a PRS signal but some other downlink reference signal or pilot signal (e.g., a common reference signal (CRS) for LTE) and the measurements of the downlink signal may not be of RSTD but instead (or in addition)

of some other quantity such as TOA, AOA, RSSI, RTT, S/N etc. Although the positioning protocol, the position method and/or the measured quantities may differ, the provision of frequency error information (e.g. a frequency error characteristic) by the location server 904 to the UE 902 for some or all of the cells whose downlink signals are to be measured and the usage of the frequency error information by the UE 902 to determine an optimum or preferred period of coherent signal integration may be the same as or similar to that described for the message flow process 900.

FIG. 9B is a process according to an implementation that may be used for portions of stages 908 to 913 performed at UE 902. In a particular implementation, aspects of blocks 922 and 924 may be performed, in whole or in part, through execution of computer-readable instructions retrieved from memory 140 and executed by processor(s) 111 or DSP(s) 112, for example. It should be understood, however, that blocks 922 and 924 may be executed by other structures without deviation from claimed subject matter. Block 922 may obtain one or more messages comprising positioning assistance for a downlink terrestrial position method which may be OTDOA (but could be another position method such as ECID or AFLT). The one or more messages may be the messages received at stage 908. Positioning assistance data obtained at block 922 may identify a plurality of cell transceivers corresponding to cells (e.g. cells 310-1 to 310-W and 312), and may comprise expected downlink carrier frequencies and one or more frequency error characteristics for at least one of the plurality of cell transceivers. As discussed above, the frequency error characteristic of a cell transceiver may be indicative of a difference between the actual downlink signal carrier frequency and an expected downlink signal carrier frequency, and may be (i) a carrier frequency error value for the cell transceiver, (ii) a carrier frequency error class for the cell transceiver or (iii) an indication that the cell transceiver is suitable or unsuitable to be used as a reference cell.

At block 924, a usage of coherent integration may be determined based, at least in part, on at least one of the frequency error characteristics received at block 922. Such a determined usage of coherent integration applied to a downlink signal may be used to measure a characteristic (e.g. an RSTD or TOA) of the downlink signal (e.g. a PRS signal) for at least one of the plurality of cell transceivers according to the downlink terrestrial positioning method (e.g. OTDOA). The usage of coherent integration determined at block 924 may be for a neighbor cell or for the reference cell if the position method is OTDOA and may be performed as part of stage 913 as described previously. In addition, stages 910, 911 and/or 912 may be performed following block 922 and prior to determining the usage of coherent integration at block 924.

In an example, a usage of coherent integration determined at block 924 may be used in acquiring a first PRS signal transmitted in a first downlink signal for determining a difference in times of arrival of the first PRS signal and at least a second PRS signal transmitted in a second downlink signal. This difference in time of arrival may be used in computing an RSTD measurement at stage 913. For acquisition of a PRS in a particular downlink signal for performing an RSTD measurement at stage 913, block 924 may determine a usage of coherent integration based, at least in part, on an associated frequency error characteristic in the positioning assistance data obtained at block 922. For example, the frequency error characteristic does not exceed a threshold value for coherent integration as described for Table 2. On the other hand, if the frequency error characteristic exceeds a threshold value, coherent integration may not be used (e.g. at stage 913) or may be combined with non-coherent integration as described herein (e.g. in association with FIG. 9 and Table 1).

According to an embodiment, a receiver (e.g. a UE 100, UE 902) may apply coherent and non-coherent integration to samples of a downlink signal in any one of several combinations. For example, consecutive samples may be coherently integrated separately over a set coherent integration intervals. Output values from coherently integrated samples over separate coherent integration intervals may then be non-coherently combined/integrated. Furthermore, a receiver may apply only non-coherent integration to a sampled downlink signal. Also, as referred to herein, a determination of a "usage of coherent integration" means a determination of one or more parameters of an application of coherent integration to at least a portion of a sampled downlink signal. In this context, determination of a "usage of coherent integration" may comprise a determination as to whether a received signal is to be processed at a receiver using a coherent integration technique, a non-coherent integration technique or both integration techniques based, at least in part, on one or more factors. For example, a determination of a usage of coherent integration may comprise a determination of whether to apply coherent integration or non-coherent integration over the portion of the sampled downlink signal. A determination of a usage of coherent integration may comprise a determination of a length or duration of an interval over which coherent integration is to be applied (e.g., time, number of samples, number of signal subframes, etc.). A determination of a usage of coherent integration may also specify that separate coherently integrated portions of a downlink signal are to be non-coherently integrated or combined. It should be understood, however, that these are merely examples of a determination of a usage of coherent integration, and that claimed subject matter is not limited in this respect.

If the downlink terrestrial positioning method at block 922 is OTDOA, block 924 may determine that at least a portion of a PRS is to be coherently integrated. A UE 902 may then integrate two or more consecutive PRS subframes of the downlink signal. Furthermore, in addition to selecting coherent integration, block 924 may determine a maximum time period for coherent integration. Also, block 924 may determine a maximum number of consecutive PRS subframes to be coherently integrated in an attempt to acquire a PRS for determining an RSTD measurement. The maximum number of subframes may be determined as described herein in association with Tables 2 and 3.

If the downlink terrestrial positioning method at block 922 is OTDOA, positioning assistance data obtained at block 922 may identify a particular cell transceiver to be used as a first reference cell transceiver for obtaining RSTD measurements for OTDOA. According to an embodiment, block 924 may then further determine a second reference cell transceiver comprising the first reference cell transceiver or another different cell transceiver from among the plurality of cell transceivers identified in the positioning assistance data at block 922. For example, positioning assistance data obtained at block 922 may further comprise a frequency error characteristic associated with the determined second reference cell transceiver and optionally a frequency error characteristic associated with the first reference cell transceiver. If the second reference cell transceiver is different from the first reference cell transceiver, in an embodiment, block 924 may determine the second reference cell transceiver based, at least in part, on the frequency error characteristic associated with the second reference cell transceiver. For example, the frequency error characteristic of the first reference cell transceiver (if provided) may be indicative of an expected error in a downlink carrier frequency of the first reference cell transceiver which is larger than an expected error in a downlink carrier frequency of the second reference cell transceiver as indicated by the frequency error characteristic of the second reference cell transceiver. A carrier frequency of the determined second reference cell transceiver (e.g. as observed or measured by a UE 902) may be chosen as a frequency source for acquiring and measuring PRS signals, using coherent and/or non-coherent integration, that are received from one or more other cell transceivers (e.g. neighbor cell transceivers) identified at block 922 in obtaining TOA and/or RSTD measurements for OTDOA.

As pointed out above, a frequency error characteristic in positioning assistance data obtained at block 922 may be expressed in any one of different forms. In one implementation, a frequency error characteristic comprises an expected frequency error value. A frequency error characteristic may also comprise an indication as to a suitability of a cell transceiver to be used as a reference cell transceiver in obtaining an RSTD measurement for OTDOA. For example, if a frequency error characteristic of the cell transceiver indicates a high inaccuracy or uncertainty in an expected carrier frequency of a downlink signal transmitted by the cell transceiver, a different cell transceiver may be used as a reference cell transceiver. This may be based, for example, on an expected accuracy or reliability of an associated expected carrier frequency of a downlink signal transmitted from the cell transceiver. In addition, a frequency error characteristic provided in positioning assistance data at block 922 may indicate a particular class of frequency error associated with an expected carrier frequency of a downlink signal. It should be understood, however, that these are merely examples of a frequency error characteristic associated with a carrier frequency of a downlink signal, and that claimed subject matter is not limited in this respect.

Figure 9C:
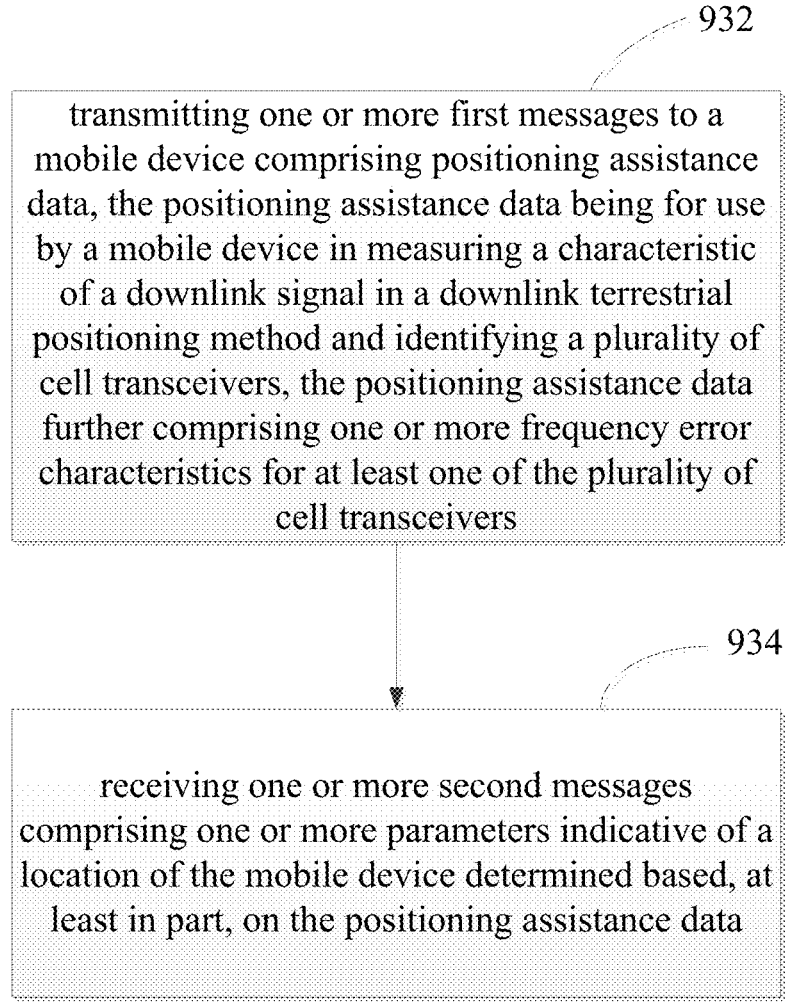
FIG. 9C is a flow diagram of a process for facilitating measurements indicative of a location of a mobile device according to an embodiment.

FIG. 9C is a flow diagram of a process that may be performed at a location server, such as E-SMLC 208, SLP 232, location server 302 or location server 904, that is in communication with a UE, such as UE 100 or UE 902, according to an embodiment. In a particular implementation, aspects of blocks 932 and 934 may be performed, in whole or in part, through execution of computer-readable instructions retrieved from working memory 1335 by processor(s) 1310 and communication subsystem 1330 (described later), for example. It should be understood, however, that blocks 932 and 934 may be executed by other structures without deviation from claimed subject matter.

Block 932 may transmit one or more first messages comprising positioning assistance data for use by the UE in measuring a characteristic (e.g. TOA or RSTD) of a downlink signal (e.g., a PRS) in a downlink terrestrial positioning method (e.g. OTDOA). The positioning assistance data may identify a plurality of cell transceivers (e.g. cell transceivers 310-1 to 310-W and 312) and may further comprise one or more frequency error characteristics for at least one of the plurality of cell transceivers. Transmission of the one or more first messages at stage 908 may correspond to stage 908 and/or stage 910 in message flow process 900. The frequency error characteristics may comprise: (i) a carrier frequency error value for a cell transceiver; (ii) a carrier frequency error class for a cell transceiver; and/or (iii) an indication that a cell transceiver is suitable or unsuitable to be used as a reference cell.

Figure 10:
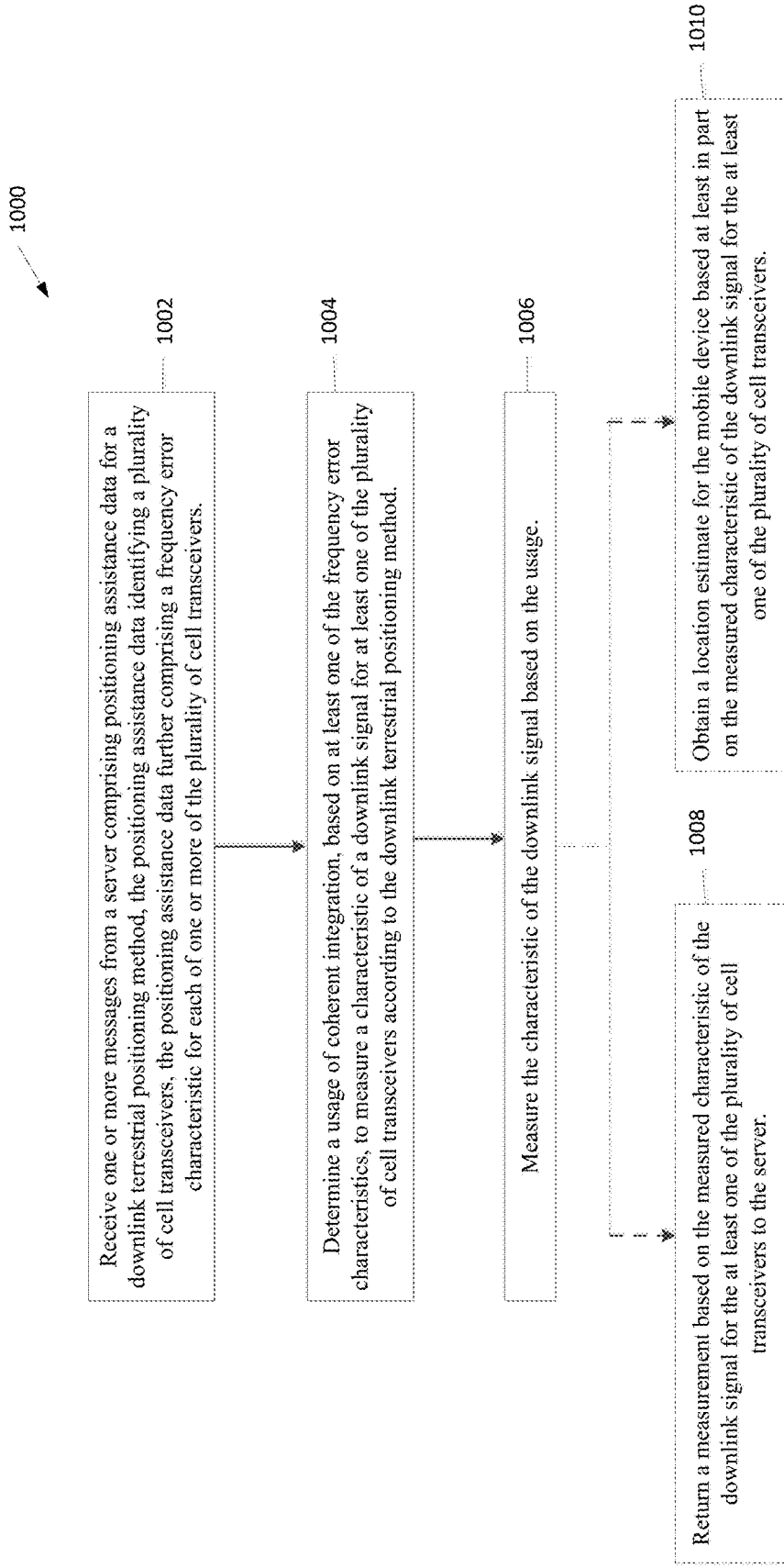
FIG. 10 is a block flow diagram of an example process for performing downlink positioning at a UE using coherent and/or non-coherent integration.

Block 934 may receive one or more second messages comprising one or more parameters indicative of a location of the UE determined based, at least in part, on the position assistance data in first messages transmitted at block 932. The one or more parameters indicative of a location of the UE may be RSTD measurements if the downlink terrestrial positioning method is OTDOA or may be other measurements (e.g. RSSI, RTT, S/N, pilot phase) for other downlink terrestrial positioning methods such as ECID or AFLT. Block 934 may correspond to stage 914 in message flow process 900. In an embodiment, the one or more parameters indicative of a location of the UE may be determined by the UE based on the one or more frequency error characteristics for at least one of the plurality of cell transceivers transmitted to the UE at block 932. The determination by the UE may be as described for stages 911. 912 and/or 913 of process message flow 900 if the downlink terrestrial positioning method is OTDOA. In an embodiment, block 934 may further comprise determining a location estimate for the UE based at least in part on the one or more parameters indicative of a location of the UE received at block 934. Determining the location may correspond to stage 916 of process message flow 900 if the downlink terrestrial positioning method is OTDOA Referring to FIG. 10, with further reference to FIGS. 1-9A, an exemplary process 1000 for support of downlink positioning using coherent and non-coherent signal acquisition by a mobile device includes the stages shown. The process 1000 is, however, an example only and not limiting. The process 1000 can be altered, e.g., by having stages added, removed, rearranged, combined, and/or performed concurrently. For example, stages 1008 and 1010 are optional and are indicated with a dashed line.

At stage 1002, a mobile device, which may be the UE 100 or the UE 902, is configured to receive one or more messages from a server comprising positioning assistance data for a downlink terrestrial positioning method, where the positioning assistance data identifies a plurality of cell transceivers and further comprises a frequency error characteristic for each of one or more of the plurality of cell transceivers. The server may be a location server such as the E-SMLC 208, the SLP 232, an H-SLP, D-SLP or the location server 904. The one or more messages received at stage 1002 may be messages for ULP, LPP, LPPe and/or LPP/LPPe. In an embodiment, the positioning assistance data received at stage 1002 may conform to positioning capabilities of the mobile device sent earlier by the mobile device to the server (e.g. as in the message at stage 906 in message flow process 900). In some embodiments, the downlink terrestrial positioning method may be OTDOA for LTE, AFLT, ECID, WiFi positioning or SRN positioning. The frequency error characteristic may comprise an expected error in an expected carrier frequency of a downlink signal (e.g., such as an expected value for the frequency error e described in association with FIGS. 5-8), a class of carrier frequency error (e.g. an upper bound, lower bound or range of values for the frequency error e described in association with FIGS. 5-8), or an indication of a cell transceiver as being suitable or unsuitable as a reference cell transceiver (e.g. for OTDOA positioning). Stage 1002 may correspond to receiving the message at stage 908 in message flow process 900 in some embodiments.

At stage 1004, the mobile device is configured to determine a usage of coherent integration, based on at least one of the frequency error characteristics received at stage 1002, to measure a characteristic of a downlink signal for at least one of the plurality of cell transceivers identified at stage 1002 according to the downlink terrestrial positioning method. In some implementations, the usage of coherent integration may comprise using a maximum time period of coherent integration. For example, the maximum time period may correspond to a maximum number of signal samples such as the number of signal samples M* described previously in association with equation (12), the number of signal samples M*/2 described previously in association with Table 1, or the number of signal samples M*/r described previously in association with Table 1. In the case that the downlink terrestrial positioning method is OTDOA for LTE, the downlink signal may comprise a PRS, the PRS may comprise a plurality of two or more consecutive subframes in each PRS positioning occasion, and/or the usage may comprise using a maximum number of consecutive LTE subframes for coherent integration for a PRS positioning occasion. For example, the maximum number of consecutive LTE subframes may correspond to the number of subframes m described in association with equation (20) and Table 2.

At stage 1006, the mobile device is configured to measure the characteristic of the downlink signal for the at least one of the plurality of cell transceivers based on the usage determined at stage 1004. In some embodiments, the characteristic of the downlink signal that is measured may be an RSSI, RTT, AOA, TOA, S/N or RSTD, or may comprise two or more of these measurements (e.g. S/N and TOA). For example, if the downlink positioning terrestrial positioning method corresponds to OTDOA, the characteristic of the downlink signal may be a TOA and/or an RSTD. In some embodiments, stage 1006 may correspond to stage 913 in message flow process 900.

At stage 1008, which may be an optional stage, the mobile device may be configured to send (or return) to the server a measurement based on the characteristic of the downlink signal for the at least one of the plurality of cell transceivers that is measured at stage 1006. The measurement may be the same as the measured characteristic obtained at stage 1006 or may be determined from the measured characteristic. For example, if the measured characteristic is a TOA of a PRS signal, the measurement may be the TOA or may be an RSTD obtained as the difference between the TOA and another TOA measured for a reference cell (or neighbor cell) as described previously for stage 913 of message flow process 900. In some embodiments, stage 1008 is performed in response to a prior request from the server for location measurements such as a request included in the one or more messages received at stage 1002 or a request included in a separate message such as the message at stage 910 of message flow process 900. In some embodiments, stage 1008 may correspond to sending the message at stage 914 in message flow process 900. In some embodiments, following stage 1008, the server obtains a location estimate for the mobile device based at least in part on the measurement sent at stage 1008, for example as described for stage 916 of message flow process 900.

At stage 1010, which may be an optional stage and an alternative to stage 1008, the mobile device obtains a location estimate for the mobile device based at least in part on the characteristic of the downlink signal for the at least one of the plurality of cell transceivers measured at stage 1006. For example, the mobile device may make use of information for the plurality of cell transceivers that is received at stage 1002 (e.g. as part of the positioning assistance data) to help determine an estimated location of the mobile device. For example, the information received at stage 1002 may include the locations of some or all of the cell transceivers and/or their transmission characteristics and possibly a BSA such as all or part of the almanac 304.

Figure 11:
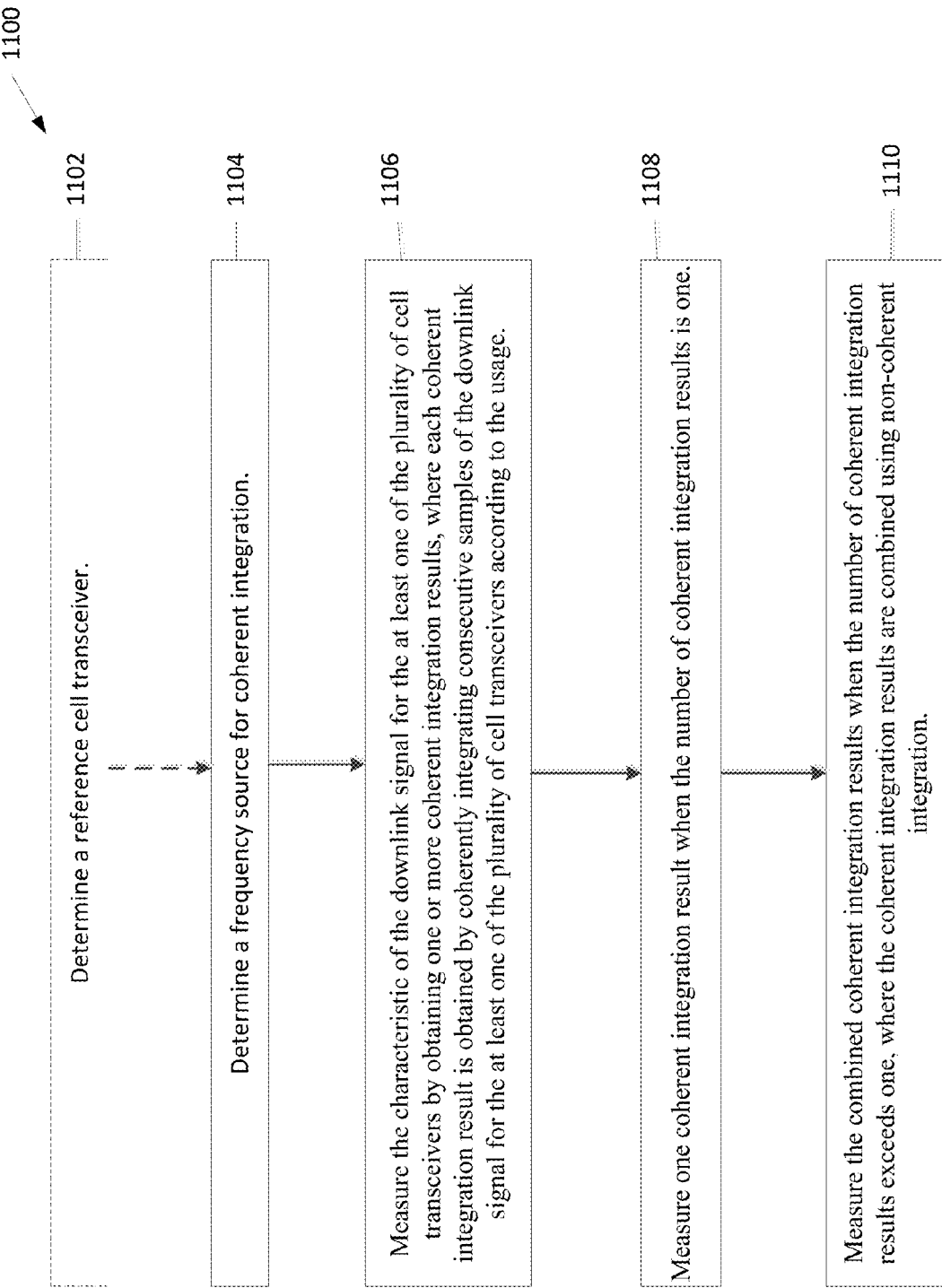
FIG. 11 is a block flow diagram of an example process for performing some of the stages in FIG. 10 according to an embodiment.

Referring to FIG. 11, with further reference to FIGS. 1-10, an exemplary process 1100 for support of downlink positioning using coherent and non-coherent signal acquisition by a mobile device includes the stages shown. The process 1100 may typically be an extension of the process 1000 and may be used by a mobile device (e.g., UE 100, UE 902) to support measurement of a downlink signal for a downlink terrestrial positioning method—e.g. as at stage 1006 of process 1000. The process 1100 is an example only and not limiting. The process 1100 can be altered, e.g., by having stages added, removed, rearranged, combined, and/or performed concurrently.

At stage 1102, the mobile device may determine a reference cell transceiver which may be for a downlink terrestrial positioning method. Stage 1102 may be an optional step and not occur for all embodiments of process 1100. For example, stage 1102 may occur when the downlink terrestrial positioning method is OTDOA for LTE but may not occur for some other downlink terrestrial positioning methods. The reference cell determined at stage 1102 may be one of the plurality of cell transceivers identified at stage 1002 when process 1100 extends process 1000. For example, the positioning assistance data received at stage 1002 may comprise an identifier for a first reference cell transceiver. The mobile device may then determine a second reference cell transceiver, where the second reference cell transceiver is either the first reference cell transceiver or another cell transceiver within the plurality of cell transceivers identified at stage 1002. The determination of the second reference cell transceiver may be based at least in part on a frequency error characteristic for the second reference cell transceiver if the second reference cell transceiver is different from the first reference cell transceiver. The frequency error characteristic for the second reference cell transceiver may be part of the positioning assistance data received at stage 1002. In some embodiments, stage 1102 may correspond to stage 911 in message flow process 900.

At stage 1104, the mobile device may be configured to determine a frequency source or more than one frequency source for coherent integration. In some embodiments, a frequency source is one of the plurality of cell transceivers identified at stage 1002 (when process 1100 extends process 1000) and the determination at stage 1104 may be based, at least in part, on a frequency error characteristic for the frequency source provided at stage 1002. For example, if the frequency error characteristic corresponds to an expected error in an expected carrier frequency of a downlink signal, a frequency source may be determined by the mobile device as a cell transceiver in the plurality of cell transceivers identified at stage 1002 that has the lowest associated expected carrier frequency error among all cell transceivers in the plurality for which an expected frequency error is provided at stage 1002. Optionally, determination of a cell transceiver as a frequency source may also be conditioned on the cell transceiver having some minimum RSSI and/or minimum S/N at the mobile device. Stage 1104 may correspond to stage 912 in message flow process 900 in some embodiments. In some embodiments the frequency source determined at stage 1104 may be the reference cell transceiver determined at stage 1102.

At stage 1106, the mobile device is configured to measure a characteristic of the downlink signal for the at least one of the plurality of cell transceivers (e.g. as used at stages 1004 and 1006) by obtaining one or more coherent integration results, where each coherent integration result is obtained by coherently integrating consecutive samples of the downlink signal for the at least one of the plurality of cell transceivers according to the usage of coherent integration determined at stage 1004. For example, in the case that the downlink terrestrial positioning method is OTDOA, the coherent integration results may be for acquisition of a PRS signal from the at least one of the plurality of cell transceivers. The coherent integration may be performed by separately integrating in-phase (I) and quadrature phase (Q) signal sample components for the downlink signal at the carrier frequency of the downlink signal as described in association with FIGS. 5-8 and equations (1) to (23). The coherent integration results may have maximum or near maximum S/N compared to coherent integration results not obtained according to the usage due to being obtained for an optimum or near optimum number of signal samples according to the usage and as described in association with FIGS. 5-8. The mobile device may use the frequency source, or one of the frequency sources, determined at stage 1104 to help perform the coherent integration at stage 1106—e.g. may use the frequency source to predict the expected carrier frequency for the at least one of the plurality of cell transceivers for which a characteristic of a downlink signal is being measured. The frequency source may or may not have the same expected carrier frequency as the at least one of the plurality of cell transceivers. Although equal carrier frequencies have sometimes been assumed herein, different carrier frequencies are possible in which case the mobile device may convert the carrier frequency for the frequency source A into an expected carrier frequency for the at least one of the plurality of cell transceivers B (e.g. by multiplication by a factor equal to (expected frequency of B)/(frequency for A)).

At stage 1108, the mobile device is configured to measure one coherent integration result obtained at stage 1106 if the number of coherent integration results obtained at stage 1106 is one. For example, the mobile device may measure a TOA or RSTD for the one coherent integration result as at stage 913 in message flow process 900.

At stage 1110 which may be an alternative to stage 1108, the mobile device is configured to measure combined coherent integration results obtained at stage 1106 if the number of coherent integration results obtained at stage 1106 exceeds one, where the coherent integration results obtained at stage 1106 are combined using non-coherent integration. For example, the combining may correspond to that described previously in association with FIG. 8 and equations (13) to (21). Combining coherent integration results using non-coherent integration may enable a maximum or near maximum S/N for the measurement of the downlink terrestrial signal (e.g. a TOA or RSTD measurement) which may improve measurement accuracy.

Figure 12:
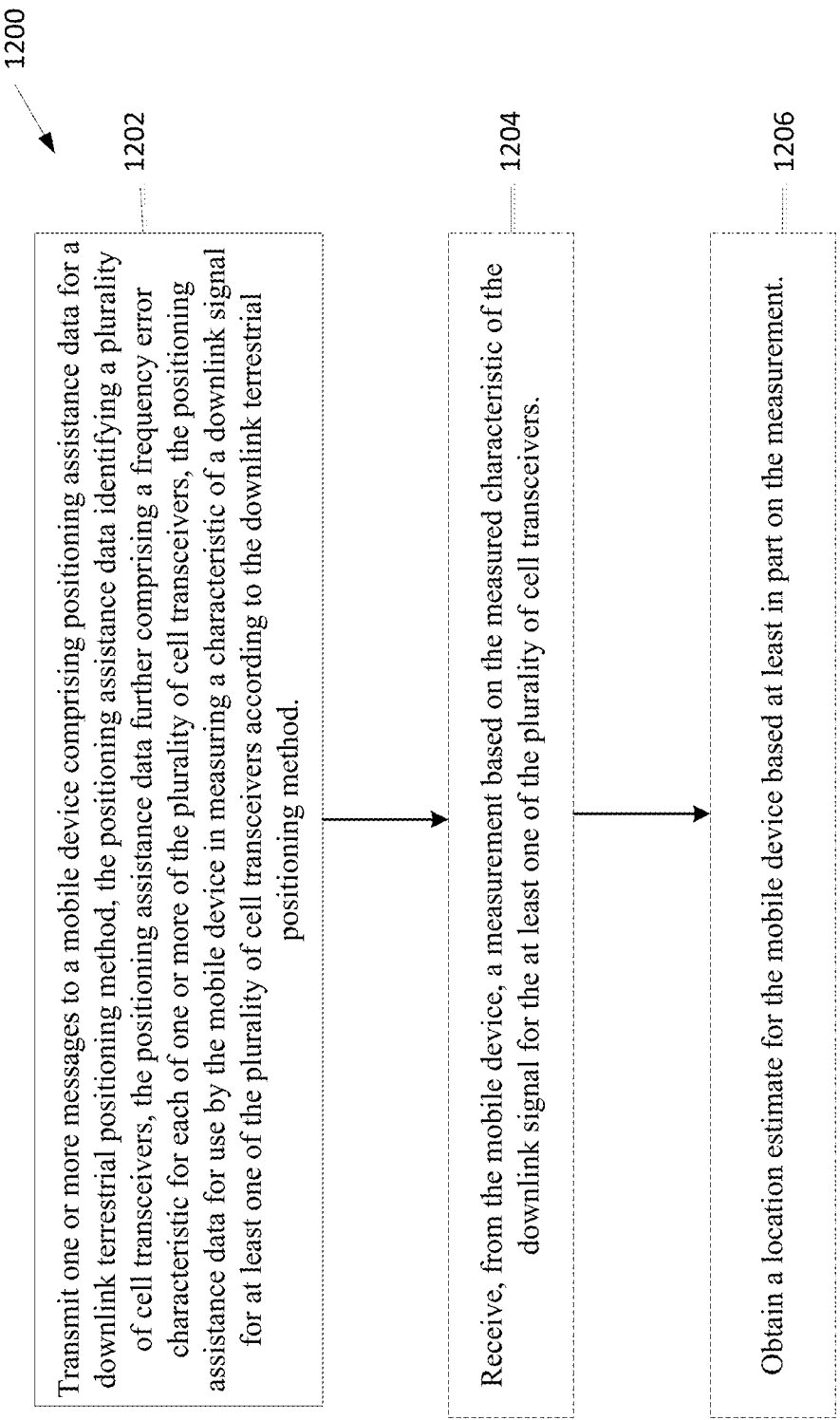
FIG. 12 is a block flow diagram of an example process for supporting downlink positioning at a server using coherent and/or non-coherent integration.

Referring to FIG. 12, with further reference to FIGS. 1-9A, an exemplary process 1200 for support of downlink positioning using coherent and non-coherent signal acquisition by a server includes the stages shown. The server may correspond to the E-SMLC 208, SLP 232, a D-DLP, H-SLP, the location server 302 or the location server 904. The process 1200 is, however, an example only and not limiting. The process 1200 can be altered, e.g., by having stages added, removed, rearranged, combined, and/or performed concurrently. For example, stages 1204 and 1206 are optional and are indicated with a dashed line.

At stage 1202, the server is configured to transmit one or more messages to a mobile device comprising positioning assistance data for a downlink terrestrial positioning method. The positioning assistance data may identify a plurality of cell transceivers and may further comprise a frequency error characteristic for each of one or more of the plurality of cell transceivers. The positioning assistance data may be for use by the mobile device in measuring a characteristic of a downlink signal for at least one of the plurality of cell transceivers according to the downlink terrestrial positioning method. The one or more messages transmitted at stage 1202 may be messages for ULP, LPP, LPPe and/or LPP/LPPe. In an embodiment, the positioning assistance data transmitted at stage 1202 may conform to positioning capabilities of the mobile device received earlier by the server (e.g. as received in the message at stage 906 in message flow process 900). In some embodiments, the downlink terrestrial positioning method may be OTDOA for LTE, AFLT, ECID, WiFi positioning or SRN positioning. The frequency error characteristic may comprise an expected carrier frequency error (e.g. such as an expected value for the frequency error e described in association with FIGS. 5-8), a class of carrier frequency error (e.g. an upper bound, lower bound or range of values for the frequency error e described in association with FIGS. 5-8), or an indication of a cell transceiver as being suitable or unsuitable as a reference cell transceiver (e.g. for OTDOA positioning). Stage 1202 may correspond to sending the message at stage 908 in message flow process 900 in some embodiments.

At stage 1204 which may be an optional stage, the server may be configured to receive, from the mobile device, a measurement based on the measured characteristic of the downlink signal for the at least one of the plurality of cell transceivers. In some embodiments, such as where the downlink terrestrial positioning method is OTDOA for LTE, the measurement may be an RSTD measurement for the at least one of the plurality of cell transceivers. In some embodiments, stage 1204 is performed in response to a prior request transmitted from the server to the mobile device for location measurements such as a request included in the one or more messages transmitted at stage 1202 or a request included in a separate message such as the LPP Request Location Information message at stage 910 of message flow process 900. In some embodiments, stage 1204 may correspond to receiving the message at stage 914 in message flow process 900.

At stage 1206, which may be an optional stage, the server may be configured to obtain a location estimate for the mobile device based at least in part on the measurement received at stage 1204. In an embodiment, stage 1206 may correspond to stage 916 in message flow process 900.

Figure 13:
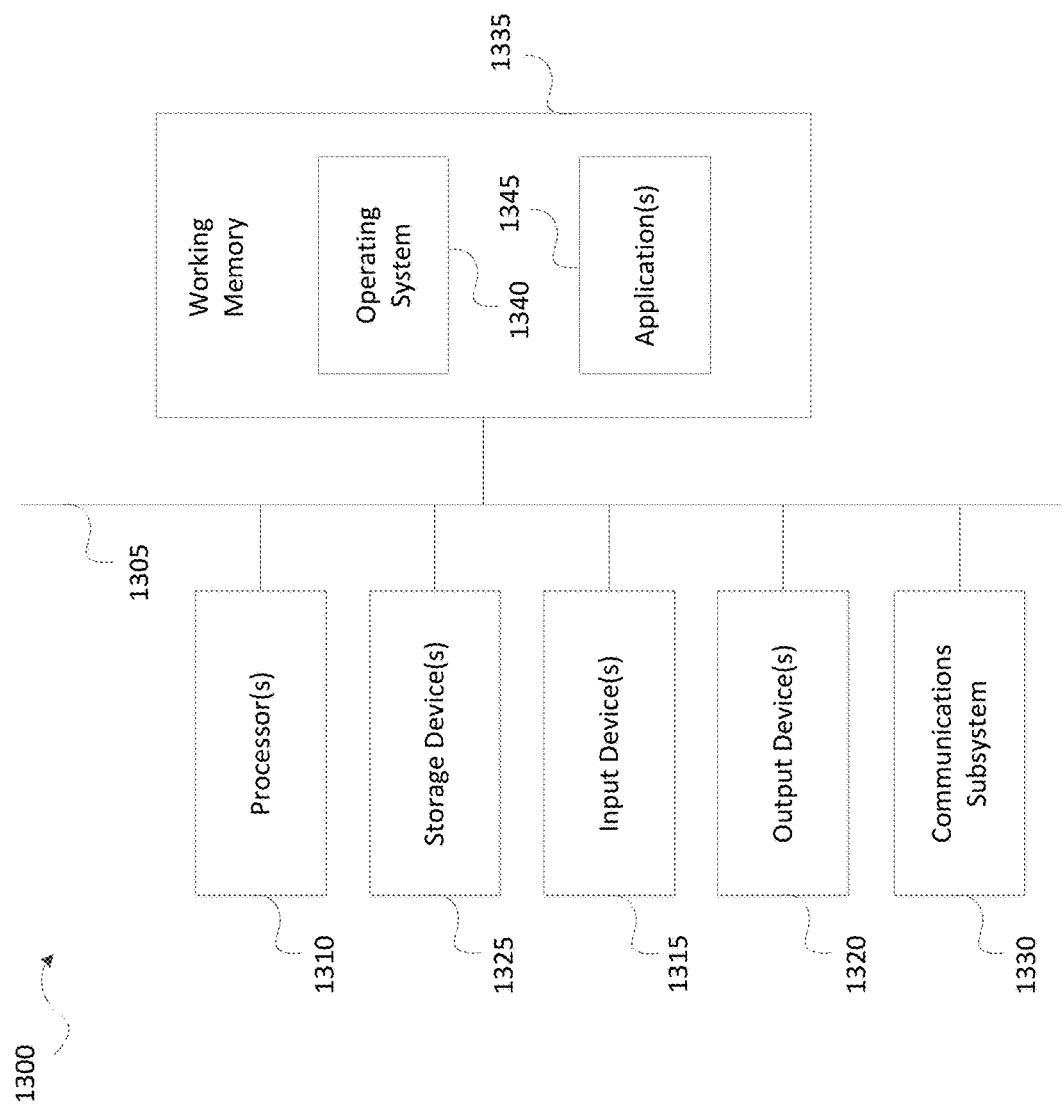
FIG. 13 is a block diagram of components of one embodiment of a computer system for use in positioning.

Referring to FIG. 13, with further reference to FIGS. 1-12, a computer system 1300 may be utilized to support or help support downlink positioning using coherent and/or non-coherent signal acquisition by implementing at least some of the functionality of some of the elements in FIGS. 1, 2, 3, 9A, 9B, 9C, 10, 11 and 12. FIG. 13 provides a schematic illustration of one embodiment of a computer system 1300 that can perform the methods provided by various other embodiments, as described herein, and/or can function as a mobile device (e.g. UE 100, UE 902) or other computer system. For example, E-SMLC 208, SLP 232, the location server 302, location server 904 and the almanac 304 may be comprised of one or more computer systems 1300. FIG. 13 provides a generalized illustration of various components, any or all of which may be utilized as appropriate. FIG. 13 therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which can include without limitation a mouse, a keyboard and/or the like; and one or more output devices 1320, which can include without limitation a display device, a printer and/or the like. The processor(s) 1310 can include, for example, intelligent hardware devices, e.g., a central processing unit (CPU) such as those made by Intel® Corporation or AMD®, a microcontroller, an ASIC, etc. Other processor types could also be utilized.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1300 may also include a communications subsystem 1330, which can include without limitation a modem, a network card (wireless or wired), an infrared communication device, a wireless communication device and/or chipset (such as a Bluetooth short-range wireless communication technology transceiver/device, an 802.11 device, a WiFi device, a WiMax device, cellular communication facilities, etc.), and/or the like. The communications subsystem 1330 may permit data to be exchanged with a network (such as the network 250 or 306), other computer systems, and/or any other devices described herein. In many embodiments, the computer system 1300 will further comprise, as here, a working memory 1335, which can include a RAM or ROM device, as described above.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computer system, such as the computer system 1300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

The computer system 1300 may be used to perform methods in accordance with the disclosure. Some or all of the procedures of such methods may be performed by the computer system 1300 in response to processor 1310 executing one or more sequences of one or more instructions (which might be incorporated into the operating system 1340 and/or other code, such as an application programs 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein.

The terms "machine-readable medium" and "computer-readable medium," as used herein, refer to any medium that participates in providing data that causes a machine to operate in a specific fashion. In an embodiment implemented using the UE 100 and/or the computer system 1300, various computer-readable media might be involved in providing instructions/code to processor(s) 111, 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 140, 1325. Volatile media include, without limitation, dynamic memory, such as the working memory 140, 1335. Transmission media include, without limitation, coaxial cables, copper wire and fiber optics, including the wires that comprise the bus 101, 1305, as well as the various components of the communications subsystem 1330 (and/or the media by which the communications subsystem 1330 provides communication with other devices). Hence, transmission media can also take the form of waves (including without limitation radio, acoustic and/or light waves, such as those generated during radio-wave and infrared data communications).

According to an embodiment a method at a server comprises: transmitting one or more messages to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers. The method may further comprise receiving, from the mobile device, a measurement based on the measured characteristic of the downlink signal for the at least one of the plurality of cell transceivers; and obtaining an estimated location of the mobile device based at least in part on the measurement. In one particular implementation, the downlink terrestrial positioning method comprises an Observed Time Difference Of Arrival (OTDOA) method for Long Term Evolution (LTE), and wherein the downlink signal comprises a Positioning Reference Signal (PRS). In another particular implementation, the measurement comprises a reference signal time difference (RSTD) measurement. In another particular implementation, the PRS for the at least one of the plurality of cell transceivers comprises a plurality of two or more consecutive subframes in each PRS positioning occasion. In another particular implementation, at least one of the frequency error characteristics for at least one of the plurality of cell transceivers comprises an expected carrier frequency error. In another particular implementation, at least one of the frequency error characteristics for at least one of the plurality of cell transceivers comprises a class of carrier frequency error. In another particular implementation, at least one of the frequency error characteristics for at least one of the plurality of cell transceivers comprises an indication of suitability or unsuitability as a reference cell transceiver. In another particular implementation, the one or more messages are transmitted according to the Long Term Evolution (LTE) Positioning Protocol (LPP).

According to an embodiment, a server comprises: a communications subsystem; and one or more processors coupled to the communications subsystem, the one or more processors being configured to initiate transmission of one or more messages through the communications subsystem to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers. In a particular implementation, the one or more processors are further configured to: obtain a measurement received from the mobile device, the measurement being based on the measured characteristic of the downlink signal for the at least one of the plurality of cell transceivers; and obtain an estimated location of the mobile device based at least in part on the measurement. In one particular implementation, the downlink terrestrial positioning method comprises an Observed Time Difference Of Arrival (OTDOA) method for Long Term Evolution (LTE), and wherein the downlink signal comprises a Positioning Reference Signal (PRS). In another particular implementation, the measurement comprises a reference signal time difference (RSTD) measurement. In another particular implementation, the PRS for the at least one of the plurality of cell transceivers comprises a plurality of two or more consecutive subframes in each PRS positioning occasion. In another particular implementation, at least one of the frequency error characteristics for at least one of the plurality of cell transceivers comprises an expected carrier frequency error. In another particular implementation, at least one of the frequency error characteristics for at least one of the plurality of cell transceivers comprises a class of carrier frequency error. In another particular implementation, at least one of the frequency error characteristics for at least one of the plurality of cell transceivers comprises an indication of suitability or unsuitability as a reference cell transceiver. In another particular implementation, the one or more messages are transmitted according to the Long Term Evolution (LTE) Positioning Protocol (LPP).

According to an embodiment, a storage medium comprises computer readable instruction stored thereon which are executable by one or more processors of a server to: initiate transmission of one or more first messages to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers. In a particular implementation, the instructions are further executable by the one or more processors to obtain a measurement, received from the mobile device, which is based on the measured characteristic of the downlink signal for the at least one of the plurality of cell transceivers; and obtain an estimated location of the mobile device based at least in part on the measurement. In one particular implementation, the downlink terrestrial positioning method comprises an Observed Time Difference Of Arrival (OTDOA) method for Long Term Evolution (LTE), and wherein the downlink signal comprises a Positioning Reference Signal (PRS). In another particular implementation, the measurement comprises a reference signal time difference (RSTD) measurement. In another particular implementation, the PRS for the at least one of the plurality of cell transceivers comprises a plurality of two or more consecutive subframes in each PRS positioning occasion. In another particular implementation, at least one of the frequency error characteristics for at least one of the plurality of cell transceivers comprises an expected carrier frequency error. In another particular implementation, at least one of the frequency error characteristics for at least one of the plurality of cell transceivers comprises a class of carrier frequency error. In another particular implementation, at least one of the frequency error characteristics for at least one of the plurality of cell transceivers comprises an indication of suitability or unsuitability as a reference cell transceiver. In another particular implementation, the one or more messages are transmitted according to the Long Term Evolution (LTE) Positioning Protocol (LPP).

According to an embodiment, a server comprises means for transmitting one or more messages to a mobile device comprising positioning assistance data, the positioning assistance data being for use by the mobile device in measuring a characteristic of a downlink signal in a downlink terrestrial positioning method and identifying a plurality of cell transceivers, the positioning assistance data further comprising one or more frequency error characteristics for at least one of the plurality of cell transceivers. In a particular implementation, the server further comprises: means for receiving, from the mobile device, a measurement based on the measured characteristic of the downlink signal for the at least one of the plurality of cell transceivers; and means for obtaining an estimated location of the mobile device based at least in part on the measurement. In one particular implementation, the downlink terrestrial positioning method comprises an Observed Time Difference Of Arrival (OTDOA) method for Long Term Evolution (LTE), and wherein the downlink signal comprises a Positioning Reference Signal (PRS). In another particular implementation, the measurement comprises a reference signal time difference (RSTD) measurement. In another particular implementation, the PRS for the at least one of the plurality of cell transceivers comprises a plurality of two or more consecutive subframes in each PRS positioning occasion. In another particular implementation, at least one of the frequency error characteristics for at least one of the plurality of cell transceivers comprises an expected carrier frequency error. In another particular implementation, at least one of the frequency error characteristics for at least one of the plurality of cell transceivers comprises a class of carrier frequency error. In another particular implementation, at least one of the frequency error characteristics for at least one of the plurality of cell transceivers comprises an indication of suitability or unsuitability as a reference cell transceiver. In another particular implementation, the one or more messages are transmitted according to the Long Term Evolution (LTE) Positioning Protocol (LPP).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 111, 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the UE 100 and/or computer system 1300. These signals, which might be in the form of electromagnetic signals, acoustic signals, optical signals and/or the like, are all examples of carrier waves on which instructions can be encoded, in accordance with various embodiments of the invention.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method at a mobile device comprising:
    obtaining one or more messages from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and
    determining a usage of coherent integration, based on at least one of the frequency error characteristics to measure a characteristic of a downlink signal for at least one of the plurality of cell transceivers according to the downlink terrestrial positioning method.

2. The method of claim 1, and further comprising measuring the characteristic of the downlink signal based, at least in part, on the usage of coherent integration.

3. The method of claim 2, wherein measuring the characteristic of the downlink signal for the at least one of the plurality of cell transceivers comprises:
    obtaining one or more coherent integration results, wherein each coherent integration result is obtained by coherently integrating consecutive samples of the downlink signal for the at least one of the plurality of cell transceivers according to the usage of coherent integration;
    measuring one coherent integration result if the number of coherent integration results is one; and
    measuring a combination of the one or more coherent integration results if a number of the one or more coherent integration results exceeds one, wherein the combination of the one or more coherent integration results is determined using non-coherent integration.

4. The method of claim 3, and further comprising:
    determining a frequency source for the coherently integrating consecutive samples of the downlink signal for the at least one of the plurality of cell transceivers according to the usage of coherent integration, wherein the frequency source comprises one of the plurality of cell transceivers, and the frequency source is determined based, at least in part, on a frequency error characteristic for the frequency source.

5. The method of claim 4, further comprising:
obtaining an estimated location of the mobile device based at least in part on the measured characteristic of the downlink signal for the at least one of the plurality of cell transceivers.

6. The method of claim 4, wherein the downlink terrestrial positioning method comprises an Observed Time Difference Of Arrival (OTDOA) method for Long Term Evolution (LTE), and wherein the downlink signal comprises a Positioning Reference Signal (PRS).

7. The method of claim 6, wherein the PRS for the least one of the plurality of cell transceivers comprises a plurality of two or more consecutive subframes in each PRS positioning occasion.

8. The method of claim 6, wherein determining the usage of coherent integration comprises determining a maximum number of consecutive subframes for coherent integration for a PRS positioning occasion.

9. The method of claim 6, wherein the assistance data further comprises an identifier for a first reference cell transceiver and further comprising:
determining a second reference cell transceiver, wherein the second reference cell transceiver is either the first reference cell transceiver or another cell transceiver within the plurality of cell transceivers, wherein the determination of the second reference cell transceiver is based at least in part on a frequency error characteristic for the second reference cell transceiver if the second reference cell transceiver is different from the first reference cell transceiver, wherein the assistance data comprises the frequency error characteristic for the second reference cell transceiver.

10. The method of claim 9, wherein the frequency source comprises the second reference cell transceiver.

11. The method of claim 1, wherein at least one of the one or more frequency error characteristics for the at least one of the plurality of cell transceivers comprises an expected carrier frequency error.

12. The method of claim 1, wherein at least one of the one or more frequency error characteristics for the at least one of the plurality of cell transceivers comprises a class of carrier frequency error.

13. A mobile device comprising:
a wireless transceiver to transmit messages to and receive messages from a wireless communication network; and
a processor coupled to the wireless transceiver configured to:
obtain one or more messages received at the wireless transceiver from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and
determine a usage of coherent integration, based on at least one of the frequency error characteristics to measure a characteristic of a downlink signal for at least one of the plurality of cell transceivers according to the downlink terrestrial positioning method.

14. The mobile device of claim 13, wherein the processor is further configured to measure the characteristic of the downlink signal based on the determined usage of coherent integration.

15. The mobile device of claim 14, wherein the processor is further configured to:
obtain one or more coherent integration results, wherein each coherent integration result is obtained by coherently integrating consecutive samples of the downlink signal for the at least one of the plurality of cell transceivers according to the usage of coherent integration;
measure one coherent integration result if the number of coherent integration results is one; and
measure a combination of the one or more coherent integration results if a number of the one or more coherent integration results exceeds one, wherein the combination of the one or more coherent integration results is determined using non-coherent integration.

16. The mobile device of claim 14, wherein the processor is further configured to:
initiate transmission of one or more messages through the wireless transceiver to the server comprising a measurement based, at least in part, on the measured characteristic of the downlink signal for the at least one of the plurality of cell transceivers, wherein the server is capable of determining a location estimate for the mobile device based at least in part on the measurement.

17. The mobile device of claim 16, wherein the measurement comprises a reference signal time difference (RSTD) measurement.

18. The mobile device of claim 13, wherein the downlink terrestrial positioning method comprises an Observed Time Difference Of Arrival (OTDOA) method for Long Term Evolution (LTE), and wherein the downlink signal comprises a Positioning Reference Signal (PRS).

19. The mobile device of claim 18, wherein the PRS for the least one of the plurality of cell transceivers comprises a plurality of two or more consecutive subframes in each PRS positioning occasion.

20. The mobile device of claim 19, wherein the processor is further configured to determine the usage of coherent integration based on a determination of a maximum number of consecutive subframes for coherent integration for a PRS positioning occasion.

21. The mobile device of claim 18, wherein the assistance data further comprises an identifier for a first reference cell transceiver, and wherein the processor is further configured to:
determine a second reference cell transceiver, wherein the second reference cell transceiver is either the first reference cell transceiver or another cell transceiver within the plurality of cell transceivers, wherein the determination of the second reference cell transceiver is based at least in part on a frequency error characteristic for the second reference cell transceiver if the second reference cell transceiver is different from the first reference cell transceiver, wherein the assistance data comprises the frequency error characteristic for the second reference cell transceiver.

22. The mobile device of claim 13, wherein the processor is further configured to determine the usage of coherent integration at least in part by determining a maximum time period of coherent integration.

23. The mobile device of claim 13, wherein at least one of the one or more frequency error characteristics for the at least one of the plurality of cell transceivers comprises an indication of suitability or unsuitability of the at least one of the plurality of cell transceivers as a reference cell transceiver.

24. The mobile device of claim 13, wherein the one or more messages are obtained according to the Long Term Evolution (LTE) Positioning Protocol (LPP).

25. A non-transitory storage medium comprising computer-readable instructions stored thereon which are executable by a processor of a mobile device to:
- obtain one or more messages received from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and
- determine a usage of coherent integration, based on at least one of the frequency error characteristics to measure a characteristic of a downlink signal for at least one of the plurality of cell transceivers according to the downlink terrestrial positioning method.

26. The storage medium of claim 25, wherein the instructions are further executable by the processor to measure the characteristic of the downlink signal based on the usage.

27. The storage medium of claim 26, wherein the instructions are further executable by the processor to:
- obtain one or more coherent integration results, wherein each coherent integration result is obtained by coherently integrating consecutive samples of the downlink signal for the at least one of the plurality of cell transceivers according to the usage of coherent integration;
- measure one coherent integration result if the number of coherent integration results is one; and
- measure a combination of the one or more coherent integration results if a number of the one or more coherent integration results exceeds one, wherein the combination of the one or more coherent integration results is determined using non-coherent integration.

28. A mobile device comprising:
- means for obtaining one or more messages from a server comprising positioning assistance data for a downlink terrestrial positioning method, the positioning assistance data identifying a plurality of cell transceivers, the positioning assistance data further comprising one or more frequency error characteristics for at least one of the plurality of cell transceivers; and
- means for determining a usage of coherent integration, based on at least one of the frequency error characteristics to measure a characteristic of a downlink signal for at least one of the plurality of cell transceivers according to the downlink terrestrial positioning method.

29. The mobile device of claim 28, and further comprising
- means for measuring the characteristic of the downlink signal based on the usage.

30. The mobile device of claim 29, and further comprising:
- means for obtaining one or more coherent integration results, wherein each coherent integration result is obtained by coherently integrating consecutive samples of the downlink signal for the at least one of the plurality of cell transceivers according to the usage of coherent integration;
- means for measuring one coherent integration result if the number of coherent integration results is one; and
- means for measuring a combination of the one or more coherent integration results if a number of the one or more coherent integration results exceeds one, wherein the combination of the one or more coherent integration results is determined using non-coherent integration.

* * * * *